(12) United States Patent
Kaneko et al.

(10) Patent No.: US 12,476,519 B2
(45) Date of Patent: Nov. 18, 2025

(54) ELECTRIC MOTOR HAVING FAN WITH THROUGH-HOLE AND CYLINDRICAL GUIDE FACING BRACKET

(71) Applicant: Mitsubishi Electric Corporation, Tokyo (JP)

(72) Inventors: Kenta Kaneko, Tokyo (JP); Seiji Haga, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 261 days.

(21) Appl. No.: 18/247,677

(22) PCT Filed: Dec. 24, 2020

(86) PCT No.: PCT/JP2020/048385
§ 371 (c)(1),
(2) Date: Apr. 3, 2023

(87) PCT Pub. No.: WO2022/137416
PCT Pub. Date: Jun. 30, 2022

(65) Prior Publication Data
US 2023/0412049 A1    Dec. 21, 2023

(51) Int. Cl.
*H02K 9/06* (2006.01)
(52) U.S. Cl.
CPC ..................... *H02K 9/06* (2013.01)
(58) Field of Classification Search
CPC ............ H02K 9/06; H02K 5/207; H02K 5/20; H02K 5/22; H02K 5/225; H02K 9/02; H02K 15/00

USPC ............... 310/58, 59, 60 R, 61, 62, 63, 60 A
See application file for complete search history.

(56) References Cited

U.S. PATENT DOCUMENTS

| | | | | |
|---|---|---|---|---|
| 3,497,737 | A | * 2/1970 | Philofsky | H02K 3/22 310/58 |
| 3,643,119 | A | * 2/1972 | Lukens | H02K 9/06 310/60 R |
| 4,074,156 | A | * 2/1978 | Widstrand | H02K 9/06 165/47 |

(Continued)

FOREIGN PATENT DOCUMENTS

JP    2006271081 A    10/2006

OTHER PUBLICATIONS

International Search Report (PCT/ISA/210) with translation and Written Opinion (PCT/ISA/237) mailed on Mar. 16, 2021 by the Japanese Patent Office as the International Searching Authority for International Application No. PCT/JP2020/048385. (9 pages).

*Primary Examiner* — Maged M Almawri
(74) *Attorney, Agent, or Firm* — BUCHANAN, INGERSOLL & ROONEY PC

(57) ABSTRACT

An electric motor includes a shaft supported rotatably about a rotation axis, a rotor located outward from the shaft in a radial direction of the shaft and rotatable integrally with the shaft, a stator facing the rotor in the radial direction, and a first bracket including an inlet to draw air into the electric motor from outside. The electric motor further includes a fan rotatable integrally with the shaft and having a first through-hole at a position facing a position inward from the inlet in the first bracket in the radial direction, and a first guide being cylindrical and facing the first bracket.

17 Claims, 21 Drawing Sheets

(56) References Cited

U.S. PATENT DOCUMENTS

| | | | | |
|---|---|---|---|---|
| 5,698,916 | A * | 12/1997 | Eguchi | H02K 5/128 310/58 |
| 6,078,115 | A * | 6/2000 | Uchida | H02K 9/193 310/58 |
| 6,570,276 | B1 * | 5/2003 | Morel | F04D 29/5806 310/52 |
| 6,700,235 | B1 * | 3/2004 | McAfee | H02K 9/06 310/58 |
| 6,891,290 | B2 * | 5/2005 | Nagayama | H02K 9/18 310/58 |
| 7,166,939 | B2 * | 1/2007 | Voigt | H02K 9/06 310/47 |
| 7,683,510 | B2 * | 3/2010 | Pellegrino | H02K 5/207 310/58 |
| 8,148,858 | B2 * | 4/2012 | Hassett | H02K 9/18 310/58 |
| 8,159,094 | B2 * | 4/2012 | Ruffing | H02K 1/32 310/58 |
| 8,251,168 | B2 * | 8/2012 | Bharani | B60L 3/0061 310/59 |
| 8,269,384 | B2 * | 9/2012 | Bradfield | H02K 1/20 310/58 |
| 8,519,580 | B2 * | 8/2013 | Brandl | H02K 9/16 310/58 |
| 8,536,744 | B2 * | 9/2013 | Nagayama | H02K 9/06 310/58 |
| 8,624,452 | B2 * | 1/2014 | Kubes | H02K 5/203 310/61 |
| 8,659,215 | B2 * | 2/2014 | Nagayama | F16C 35/06 310/90 |
| 8,786,148 | B2 * | 7/2014 | Yagi | F16C 35/077 310/90 |
| 9,030,064 | B2 * | 5/2015 | Haga | H02K 9/18 310/59 |
| 9,425,656 | B2 * | 8/2016 | Rasch | H02K 1/20 |
| 9,450,472 | B2 * | 9/2016 | Hatfield | H02K 11/30 |
| 9,680,340 | B2 * | 6/2017 | Noack | H02K 9/06 |
| 9,680,353 | B2 * | 6/2017 | Hümer | H02K 9/06 |
| 9,960,649 | B2 * | 5/2018 | Yoshinori | H02K 9/197 |
| 10,186,927 | B2 * | 1/2019 | Randria | H02K 1/20 |
| 10,291,101 | B2 * | 5/2019 | Wang | H02K 1/20 |
| 10,298,094 | B2 * | 5/2019 | Yamaguchi | H02K 9/26 |
| 10,312,769 | B2 * | 6/2019 | Nakazawa | H02K 9/04 |
| 10,516,309 | B2 * | 12/2019 | Mihara | H02K 1/325 |
| 11,218,056 | B2 * | 1/2022 | Okubo | B61C 3/00 |
| 11,469,635 | B2 * | 10/2022 | Dums | H02K 1/2766 |
| 11,509,194 | B2 * | 11/2022 | Oketani | H02K 1/32 |
| 11,949,317 | B2 * | 4/2024 | Ajioka | H02K 9/04 |
| 12,009,731 | B2 * | 6/2024 | Hwang | H02K 5/1675 |
| 12,062,970 | B2 * | 8/2024 | Hayami | H02K 1/20 |
| 12,068,671 | B2 * | 8/2024 | Floete | H02K 7/145 |
| 12,240,617 | B2 * | 3/2025 | Tepe | B60L 15/06 |
| 2004/0150270 | A1 * | 8/2004 | Nagayama | H02K 5/207 310/59 |
| 2006/0226717 | A1 * | 10/2006 | Nagayama | H02K 9/06 310/58 |
| 2007/0024129 | A1 * | 2/2007 | Pfannschmidt | H02K 1/20 310/59 |
| 2008/0036314 | A1 * | 2/2008 | Kanei | H02K 9/227 310/59 |
| 2010/0176670 | A1 * | 7/2010 | Gottfried | H02K 9/06 310/61 |
| 2011/0109176 | A1 * | 5/2011 | Yoshimura | H02K 9/227 310/64 |
| 2013/0057094 | A1 * | 3/2013 | Sugimoto | B60L 3/0023 310/90 |
| 2013/0119795 | A1 * | 5/2013 | Haga | H02K 9/18 310/59 |
| 2013/0241329 | A1 * | 9/2013 | Yagi | H02K 15/50 310/63 |
| 2014/0312723 | A1 * | 10/2014 | Yamaguchi | H02K 9/26 310/62 |
| 2016/0105069 | A1 * | 4/2016 | Nakazawa | H02K 9/04 310/59 |
| 2018/0320696 | A1 * | 11/2018 | Han | H02K 49/108 |
| 2020/0295628 | A1 * | 9/2020 | Reichert | H02K 5/203 |
| 2020/0395821 | A1 * | 12/2020 | Sakurada | H02K 11/20 |

* cited by examiner

ELECTRIC MOTOR HAVING FAN WITH THROUGH-HOLE AND CYLINDRICAL GUIDE FACING BRACKET

TECHNICAL FIELD

The present disclosure relates to an electric motor.

BACKGROUND ART

An electric motor includes a shaft, a rotor fixed to the shaft to rotate integrally with the shaft, and a stator facing the rotor with a spacing therebetween in a radial direction. When the electric motor is energized, the temperature rises in a stator core and stator conductors included in the stator as well as in a rotor core rotor conductors included in the rotor. As the temperature of the rotor rises, the temperature of the shaft to which the rotor is attached rises. As the temperature of the shaft rises, the temperature of a bearing rotatably supporting the shaft rises, and the temperature of a lubricant contained in the bearing rises. The rise in the temperatures of the bearing and the lubricant can cause change in the size of an internal space of the bearing, degradation of the lubricant, and the like.

To cool the components of the electric motor, the electric motor includes a fan fixed to the shaft to rotate integrally with the shaft. As the fan rotates, air outside the electric motor is drawn into the electric motor and flows through, for example, airholes in the stator core and the rotor core and spaces between the stator core and the rotor core. The air cools, for example, the stator core, the stator conductors, the rotor core, and the rotor conductors. Patent Literature 1 describes an example of such an electric motor. In the electric motor described in Patent Literature 1, air drawn into the electric motor by rotation of the fan passes through the airholes in the stator core and the rotor core and then flows out of the electric motor. This structure cools the stator core, the stator conductors, the rotor core, and the rotor conductors.

CITATION LIST

Patent Literature

Patent Literature 1: Unexamined Japanese Patent Application Publication No. 2006-271081

SUMMARY OF INVENTION

Technical Problem

Air drawn into the electric motor contains foreign objects such as dust and moisture. For an electric motor installed on an electric railway vehicle, dust contains iron dust from the wheels and the rails rubbing against each other. When outside air containing foreign objects comes in contact with components of the electric motor such as the stator conductors and the rotor conductors, the air can cause failures of the electric motor. Thus, the electric motor described in Patent Literature 1 allows the air drawn into the electric motor to pass through the airholes in the stator core and the rotor core without coming in contact with the stator conductors and the rotor conductors. Foreign objects contained in the air are under centrifugal force when flowing through the airhole in the rotor core integrally rotating with the shaft, and are pressed against the wall surface of the airhole. With the rotor core being magnetized, the iron dust in the foreign objects pressed against the wall surface of the airhole adheres to the wall surface of the airhole. The iron dust adhering to the wall surface of the airhole increases the ventilation resistance of the airhole and reduces the amount of airflow, lowering the cooling efficiency of the electric motor. The electric motor with lower cooling efficiency cannot sufficiently cool components including the stator core, the stator conductors, the rotor core, the rotor conductors, and the bearing.

In response to the above issue, an objective of the present disclosure is to provide an electric motor with improved cooling efficiency inside.

Solution to Problem

To achieve the above objective, an electric motor according to an aspect of the present disclosure includes a shaft, a rotor, a stator, a first bracket, a fan, and a first guide being cylindrical. The shaft is supported rotatably about a rotation axis. The rotor is located outward from the shaft in a radial direction of the shaft and rotatable integrally with the shaft. The stator includes a first ventilation path being a through-hole. The stator faces the rotor in the radial direction and defines a second ventilation path with the rotor. The first bracket includes an inlet to draw air into the electric motor from outside. The fan has a main surface facing the first bracket and is rotatable integrally with the shaft. The fan has a first through-hole at a position facing a position inward from the inlet in the first bracket in the radial direction. The first guide faces the first bracket.

Advantageous Effects of Invention

The electric motor according to the above aspect of the present disclosure includes the stator including the first ventilation path and defining the second ventilation path with the rotor, and the fan having the first through-hole located radially inward from the inlet of the first bracket to improve the cooling efficiency inside.

DESCRIPTION OF EMBODIMENTS

An electric motor according to one or more embodiments of the present disclosure is described in detail with reference to the drawings. In the figures, the same reference signs denote the same or equivalent components.

Embodiment 1

Figure 1:
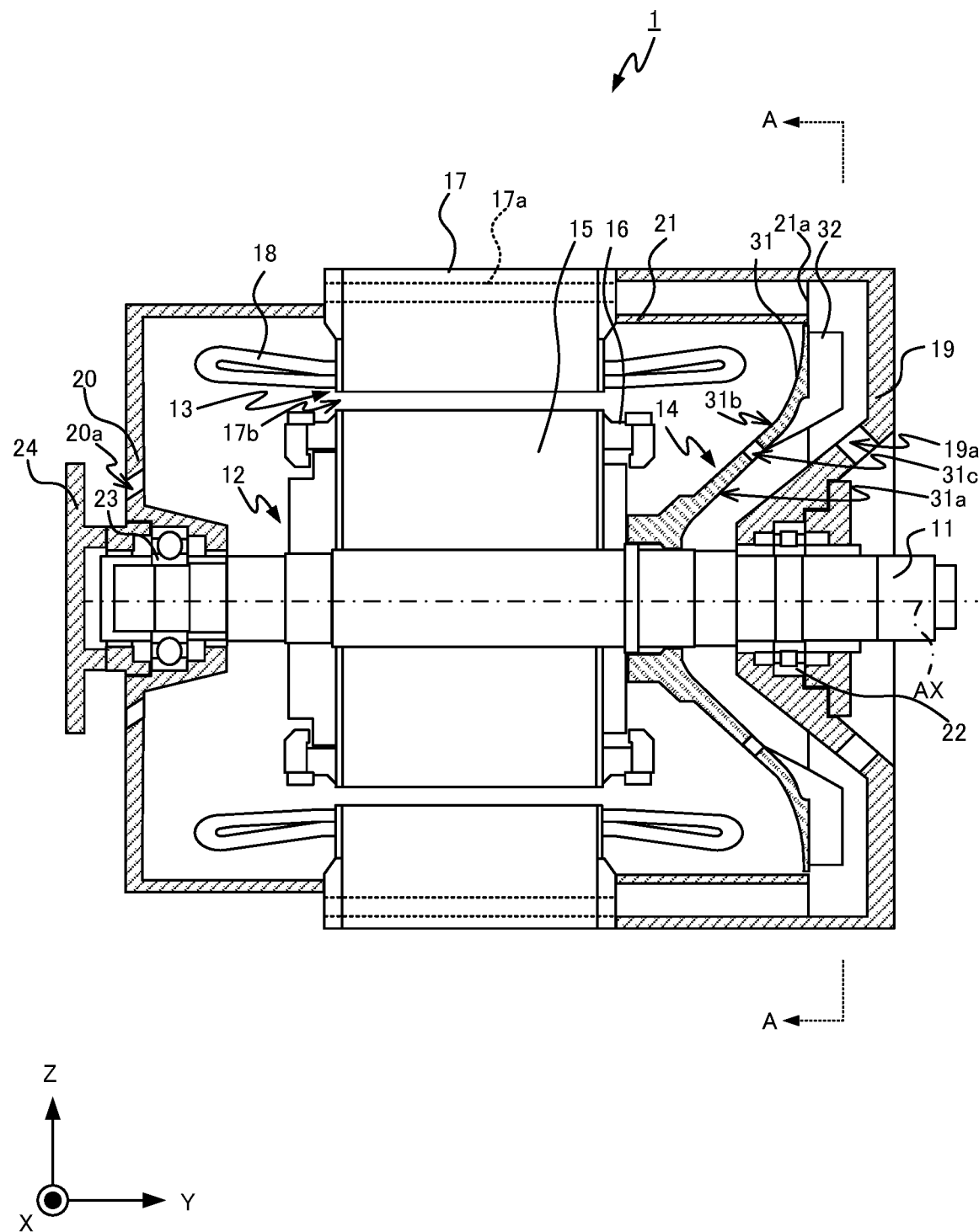
FIG. 1 is a cross-sectional view of an electric motor according to Embodiment 1.

An electric motor according to Embodiment 1 is described using, as an example, an electric motor for driving a railway vehicle. FIG. 1 illustrates the electric motor according to Embodiment 1. In FIG. 1, the Z-axis corresponds to a vertical direction, the Y-axis is parallel to a rotation axis AX of a shaft 11, and the X-axis is perpendicular to the Y-axis and the Z-axis. In FIG. 1, the rotation axis AX is indicated by a dashed-dotted line. The electric motor 1 illustrated in FIG. 1 includes the shaft 11 supported rotatably about the rotation axis AX, a rotor 12 located radially outward from the shaft 11 and rotatable integrally with the shaft 11, a stator 13 facing the rotor 12 radially, and a fan 14 rotatable integrally with the shaft 11.

The electric motor 1 also includes a first bracket 19 including inlets 19a to draw air into an internal space of the electric motor 1 from outside. The electric motor 1 preferably includes a second bracket 20 including first outlets 20a to allow air drawn in through the inlets 19a to flow out. The first bracket 19 and the second bracket 20 face each other in a rotation axis AX direction. The first bracket 19 and the second bracket 20 face each other with the rotor 12, the stator 13, and the fan 14 therebetween.

The electric motor 1 also includes a cylindrical first guide 21 facing the first bracket 19. The first guide 21 has an outer circumferential surface facing the inner circumferential surface of the first bracket 19. The first guide 21 guides air drawn in through the inlets 19a and flowing radially by rotation of the fan 14 to one end of a first ventilation path 17a facing the first bracket 19. The electric motor 1 also includes bearings 22 and 23 supporting the shaft 11 rotatably. The electric motor 1 preferably includes a shielding plate 24 that covers the first outlets 20a at a position adjacent to the first outlets 20a at a distance in the rotation axis AX direction.

The components of the electric motor 1 are described in detail. The shaft 11 has one end nearer the first bracket 19 coupled to the axle of a railway vehicle with a joint and a gear, which are not illustrated. The shaft 11 rotates to power the railway vehicle.

The rotor 12 includes a rotor core 15 fixed to the shaft 11 and rotor conductors 16 placed in grooves formed on the outer circumferential surface of the rotor core 15. Since the rotor core 15 is fixed to the shaft 11, the rotor 12 including the rotor core 15 and the rotor conductors 16 rotates integrally with the shaft 11.

The stator 13 includes a stator core 17 and stator conductors 18 placed in a grooves formed on the stator core 17. The stator core 17 includes first ventilation paths 17a penetrating through the stator core 17. More specifically, the first ventilation path 17a is located radially outward from the grooves receiving the stator conductors 18 and extends in the rotation axis AX direction. The stator core 17 faces the rotor core 15 radially at a distance and defines a second ventilation path 17b with the rotor core 15.

The fan 14 has a main surface facing the first bracket 19 and rotates integrally with the shaft 11. The fan 14 has first through-holes 31c facing the positions on the first bracket 19 radially inward from the inlets 19a in the first bracket 19. The fan 14 preferably includes an annular vane 31 fixed to the shaft 11 and having the first through-holes 31c, and first blades 32 extending away from a first main surface 31a. The first main surface 31a of the vane 31 faces the first bracket 19. A second main surface 31b opposite to the first main surface 31a faces the rotor 12 and the stator 13. The first through-holes 31c face the first bracket 19 at positions radially inward from the inlets 19a in the first bracket 19. The first blades 32 are located radially outward from the first through-holes 31c and fixed to the first main surface 31a. The first blades 32 fixed to the first main surface 31a of the vane 31 include the first blades 32 formed separately from the vane 31 and fixed to the first main surface 31a by, for example, welding or bonding, and the first blades 32 formed integrally with the vane 31.

Figure 2:
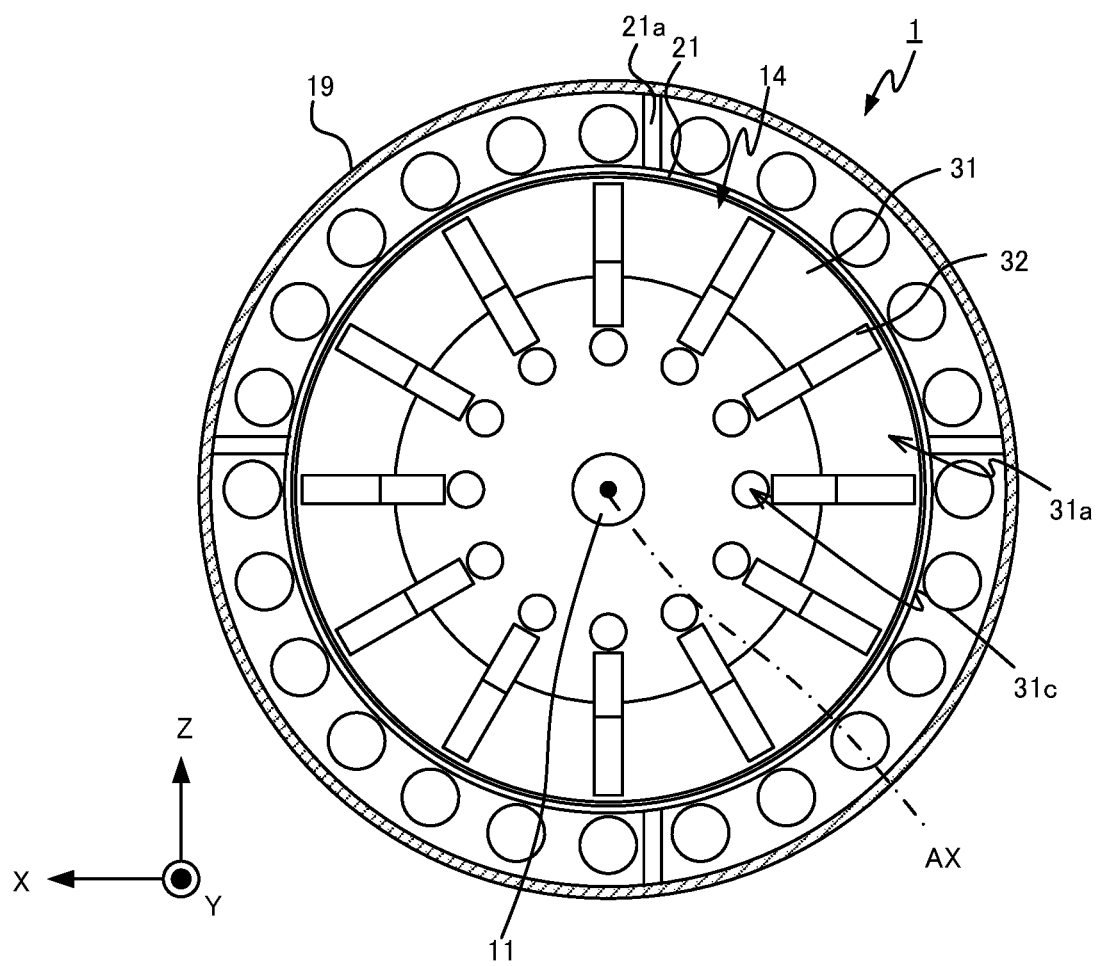
FIG. 2 is a cross-sectional view of the electric motor according to Embodiment 1 taken along line A-A in FIG. 1 as viewed in the direction indicated by arrows.

As illustrated in the cross-sectional view in FIG. 2 taken along line A-A in FIG. 1 as viewed in the direction indicated by arrows, the fan 14 includes the first blades 32 located at intervals in the circumferential direction, or more specifically, about the Y-axis. The vane 31 has the first through-holes 31c located circumferentially at intervals. To avoid complexity of the drawing, the surface of the first bracket 19 intersecting with the rotation axis AX and the bearing 22 are not illustrated in FIG. 2.

Figure 3:
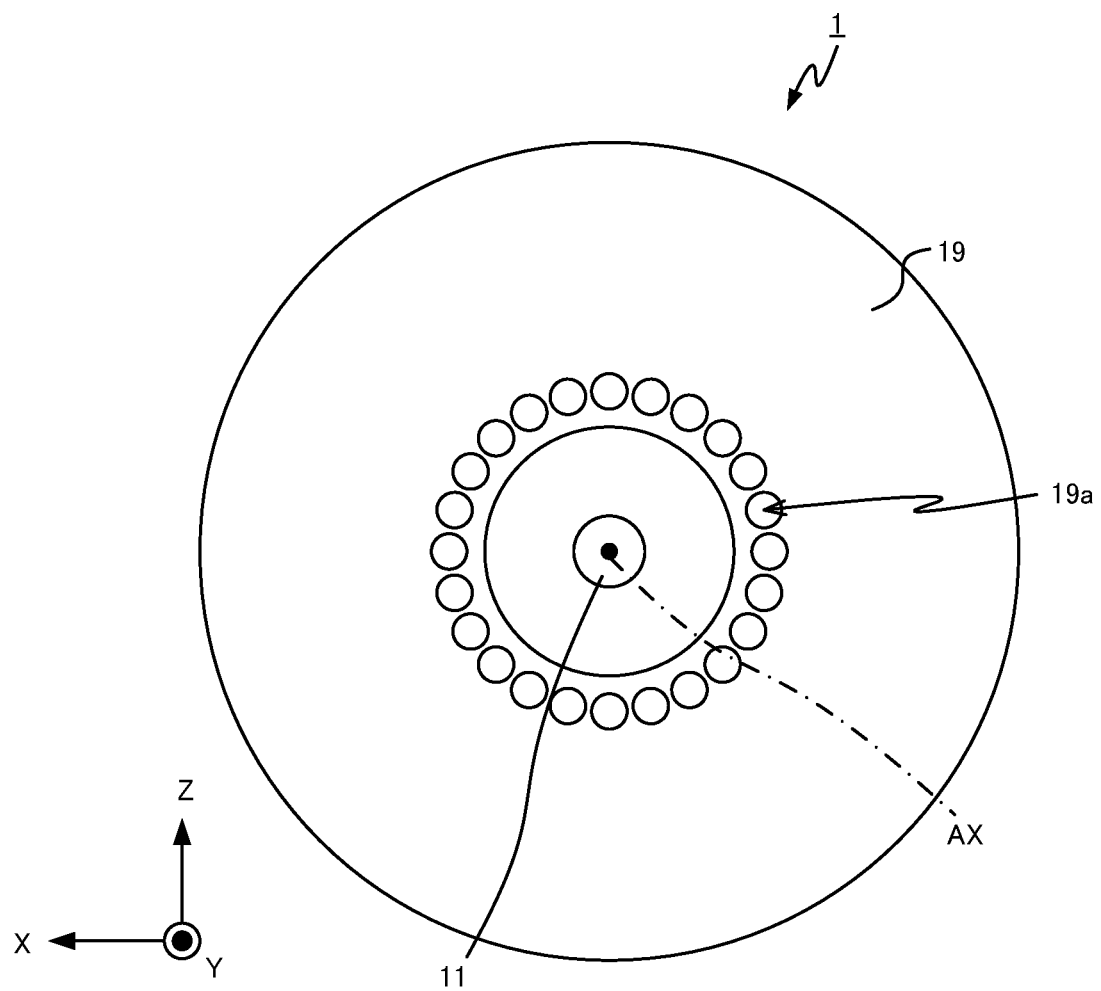
FIG. 3 is a side view of the electric motor according to Embodiment 1.

As illustrated in FIG. 1, the first bracket 19 holds the bearing 22. As in FIG. 3 illustrating the electric motor 1 as viewed in the negative Y-direction, the first bracket 19 includes the inlets 19a located circumferentially at intervals. The first bracket 19 preferably includes the inlets 19a at positions facing the first blades 32. In other words, the distance from the rotation axis AX to each first blade 32 preferably matches the distance from the rotation axis AX to each inlet 19a.

Figure 4:
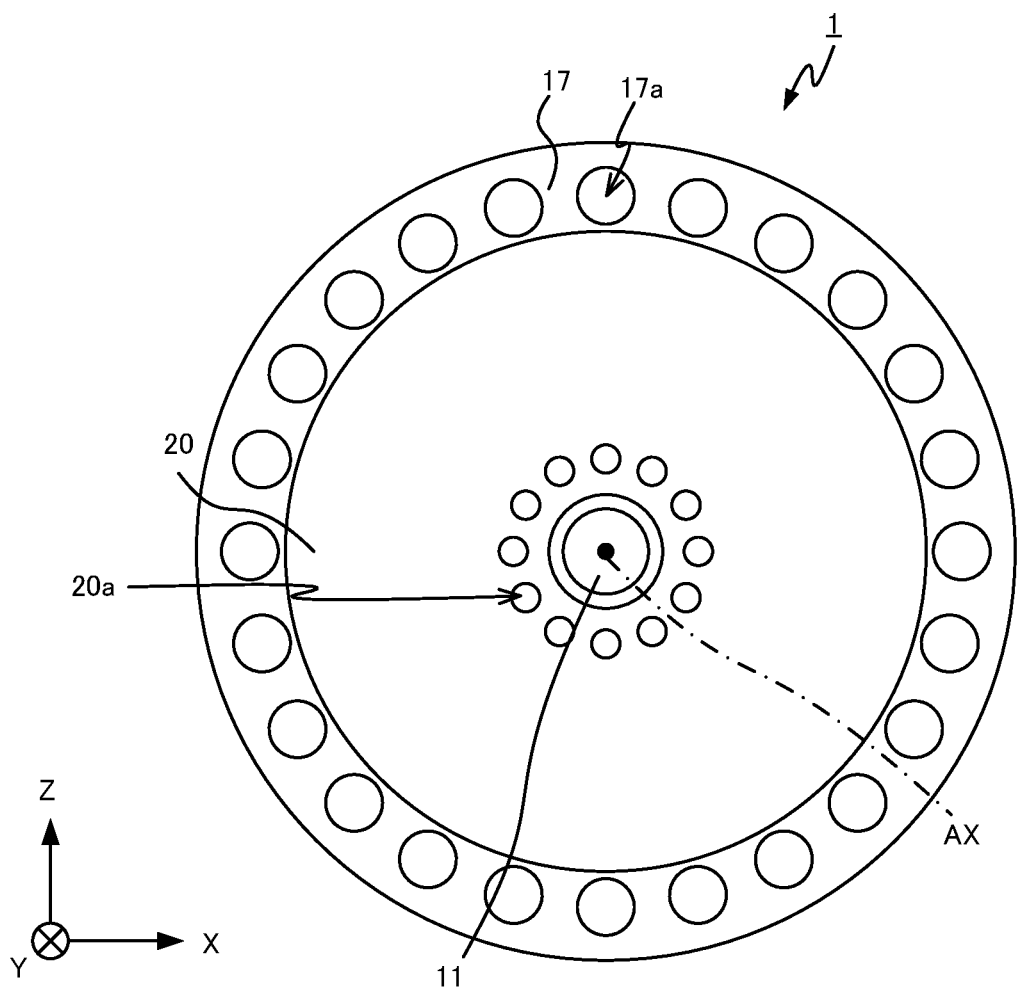
FIG. 4 is a side view of the electric motor according to Embodiment 1.

As illustrated in FIG. 1, the second bracket 20 holds the bearing 23. As in FIG. 4 illustrating the electric motor 1 as viewed in the positive Y-direction, the second bracket 20 includes the first outlets 20a located circumferentially at intervals. The outer circumferential surface of the second bracket 20 is located radially inward from the first ventilation paths 17a in the stator 13. For ease of illustration, the shielding plate 24 is not illustrated in FIG. 4.

As illustrated in FIG. 1, one end of each first outlet 20a in the second bracket 20 facing outside is preferably located lower in Z-direction than the other end of the first outlet 20a.

The first guide 21 is cylindrical. The first guide 21 is fixed to the first bracket 19 by fixing members 21a. The fixing members 21a are fixed to the outer circumferential surface of the first guide 21 and the inner circumferential surface of the first bracket 19. For example, the first guide 21 is fixed to the first bracket 19 by plates serving as the fixing members 21a being fixed to the inner circumferential surface of the first bracket 19 and the outer circumferential surface of the first guide 21 with an adhesive. The first guide 21 defines a channel with the inner circumferential surface of the first bracket 19 and guides air flowing radially by rotation of the fan 14 to the first ventilation paths 17a in the stator core 17. The first guide 21 preferably defines a labyrinth channel with the fan 14. This structure suppresses the likelihood that air flowing radially by rotation of the fan 14 through a space between the first guide 21 and the fan 14 comes in contact with the rotor conductors 16 and the stator conductors 18.

Figure 5:
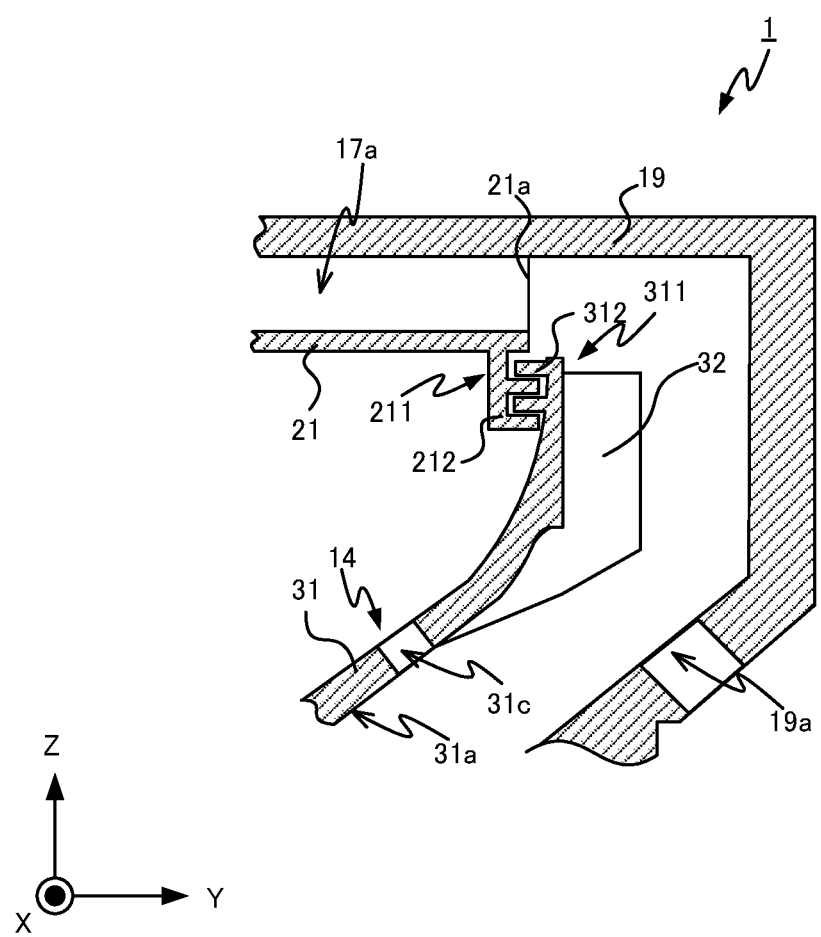
FIG. 5 is a partial cross-sectional view of the electric motor according to Embodiment 1.

For example, as illustrated in FIG. 5, the first guide 21 defines a labyrinth channel with the fan 14. More specifically, an end portion 211 of the first guide 21 in the rotation axis AX direction and a radial end portion 311 of the vane 31 in the fan 14 face each other in the rotation axis AX direction. The end portion 211 of the first guide 21 includes a first recess-protrusion portion 212 including annular recesses recessed in the rotation axis AX direction and having the center axis aligned with the rotation axis AX and annular protrusions protruding in the rotation axis AX direction and having the center aligned with the rotation axis AX. The recesses and the protrusions are arranged alternately radially. The radial end portion 311 of the vane 31 includes a second recess-protrusion portion 312 including an annular recess recessed in the rotation axis AX direction and having the center aligned with the rotation axis AX and annular protrusions protruding in the rotation axis AX direction and having the center aligned with the rotation axis AX. The recess and the protrusions are arranged alternately radially. The first guide 21 and the fan 14 with the above structures define a labyrinth channel therebetween, with the fan 14 being rotatable integrally with the shaft 11. For example, the recesses in the first recess-protrusion portion 212 and the protrusions in the second recess-protrusion portion 312 face each other at a distance less than 10 millimeters in the rotation axis AX direction. The protrusions in the first recess-protrusion portion 212 and the recesses in the second recess-protrusion portion 312 face each other at a distance less than 10 millimeters in the rotation axis AX direction.

As illustrated in FIG. 1, the bearings 22 and 23 support the shaft 11 to allow the shaft 11 to rotate about the rotation axis AX.

The shielding plate 24 is a plate with a circular cross section taken perpendicularly to the Y-axis. The shielding plate 24 covers the first outlets 20a at a position adjacent to and apart from the first outlets 20a in the rotation axis AX direction. More specifically, the shielding plate 24 is adjacent to the first outlets 20a at a position to avoid blocking the airflow out of the first outlets 20a and to suppress foreign objects entering the electric motor 1 through the first outlets 20a.

When the electric motor 1 with the above structure is energized, the temperature rises in the stator core 17, the stator conductors 18, the rotor core 15, and the rotor conductors 16. As the temperature of these components rises, the temperature of the shaft 11 rises, and the temperature of the bearings 22 and 23 rises. When the electric motor 1 is energized to rotate the rotor core 15 and the shaft 11 integrally, the fan 14 rotates together with the shaft 11 to draw air outside the electric motor 1 into the electric motor 1 through the inlets 19a.

Figure 6:
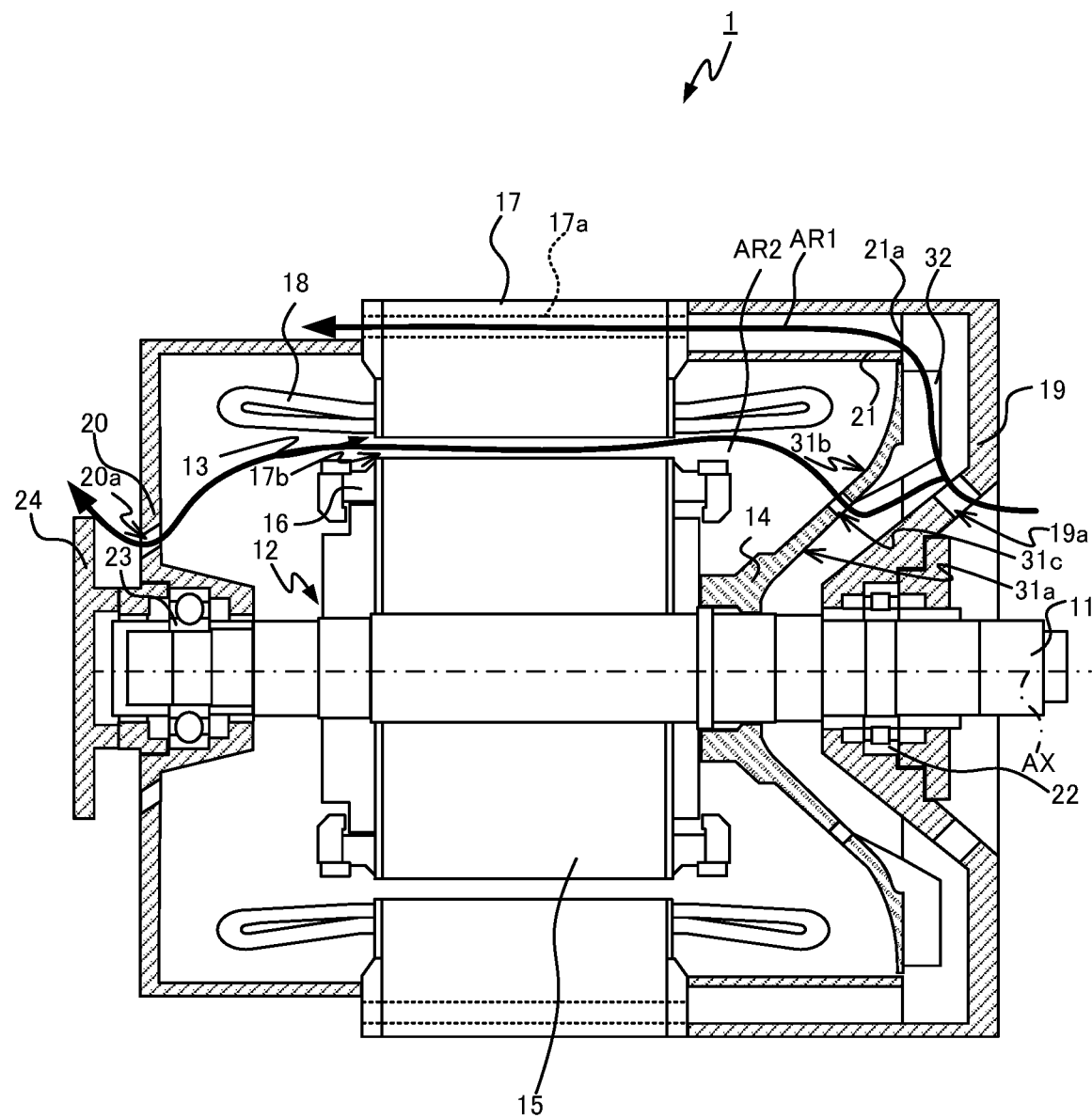
FIG. 6 is a diagram illustrating an airflow in the electric motor according to Embodiment 1.
Figure 6:
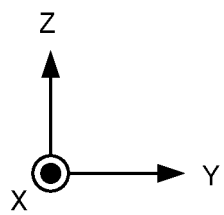

FIG. 6 illustrates airflow in the electric motor 1 with arrows AR1 and AR2. As indicated by the arrows AR1 and AR2, the fan 14 rotates to draw air outside the electric motor 1 through the inlets 19a into a space defined between the inner circumferential surface of the first bracket 19 and the first main surface 31a of the vane 31. The air contains foreign objects such as dust and moisture. The fan 14 rotates to generate centrifugal force acting on the foreign objects to cause the air containing the foreign objects to flow radially as indicated by the arrow AR1 to the first ventilation path 17a as guided by the first guide 21. The air guided to one end of the first ventilation path 17a passes through the first ventilation path 17a to flow out through the other end of the first ventilation path 17a.

Since the centrifugal force acts on the foreign objects in the air, the air from which the foreign objects are removed, as indicated by the arrow AR2, flows through the first through-holes 31c located radially inward from the first blades 32 and then flows along one end of the rotor conductors 16 and one end of the stator conductors 18, and reaches the second ventilation path 17b. The air having reached the second ventilation path 17b passes through the second ventilation path 17b, flows near the other end of the rotor conductors 16 and the other end of the stator conductors 18, and flows out through the first outlets 20a. As indicated by the arrows AR1 and AR2, air flows in the electric motor 1 to cool the electric motor 1.

As described above, the electric motor 1 according to Embodiment 1 is cooled by air flowing through the electric motor 1 as indicated by the arrows AR1 and AR2 in FIG. 6. As indicated by the arrow AR2, the air passing near the rotor conductors 16 and the stator conductors 18 is the air from which foreign objects are removed by rotation of the fan 14. This suppresses foreign objects coming in contact with the rotor conductors 16 and the stator conductors 18, thus reducing failures of the electric motor 1 occurring due to foreign objects.

With the first bracket 19 having the inlets 19a at positions facing the first blades 32, foreign objects in the air drawn in through the inlets 19a promptly move radially outward along the first blades 32. This structure thus suppresses air containing foreign objects reaching the first through-holes 31c.

With the second bracket 20 having the ends of the first outlets 20a facing outside located lower than the other ends of the first outlets 20a in Z-direction, entry of the foreign objects into the electric motor 1 through the first outlets 20a can be suppressed. This reduces failures of the electric motor 1 occurring due to foreign objects.

Embodiment 2

The fan 14 may have any other shape that draws air flowing through the inlets 19a, allows a portion of the air drawn in through the inlets 19a to flow radially to the first ventilation paths 17a, and allows the air flowing through the inlets 19a to flow to the second ventilation path 17b. In Embodiment 2, the fan 14 further includes blades extending from the second main surface 31b of the vane 31.

Figure 7:
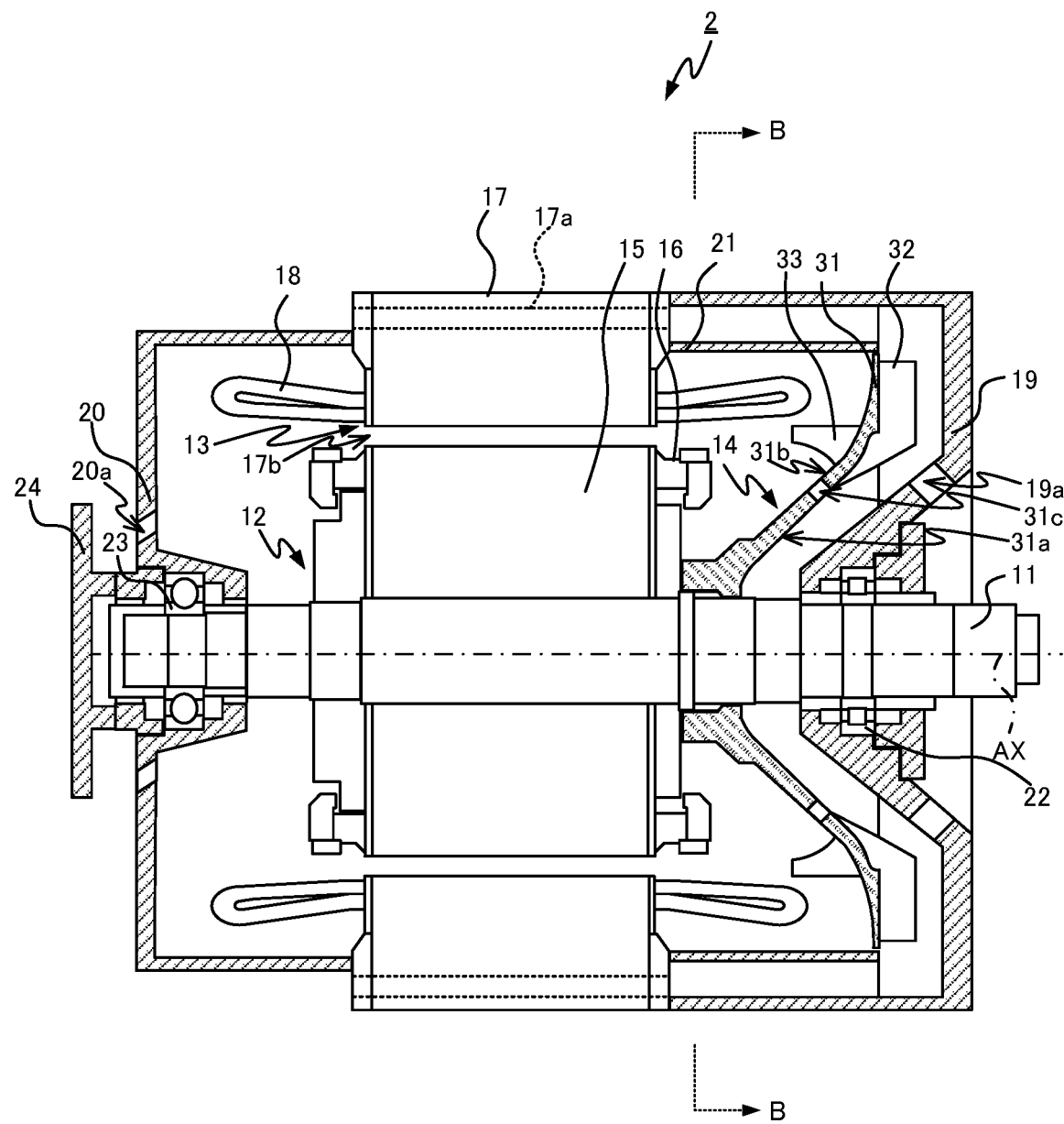
FIG. 7 is a cross-sectional view of an electric motor according to Embodiment 2.

FIG. 7 illustrates an electric motor 2 including a fan 14 including, in addition to the components of the fan 14 included in the electric motor 1 according to Embodiment 1, second blades 33 fixed to the second main surface 31b of the vane 31 and extending away from the second main surface 31b. The second blades 33 are located radially outward from the first through-holes 31c and fixed to the second main surface 31b. The second blades 33 fixed to the second main surface 31b include the second blades 33 formed separately from the vane 31 and fixed to the second main surface 31b of the vane 31 by, for example, welding or bonding, and the second blades 33 formed integrally with the vane 31.

The first blades 32 are preferably radially longer than the second blades 33. The second blades 33 preferably extend toward the second ventilation path 17b.

Figure 8:
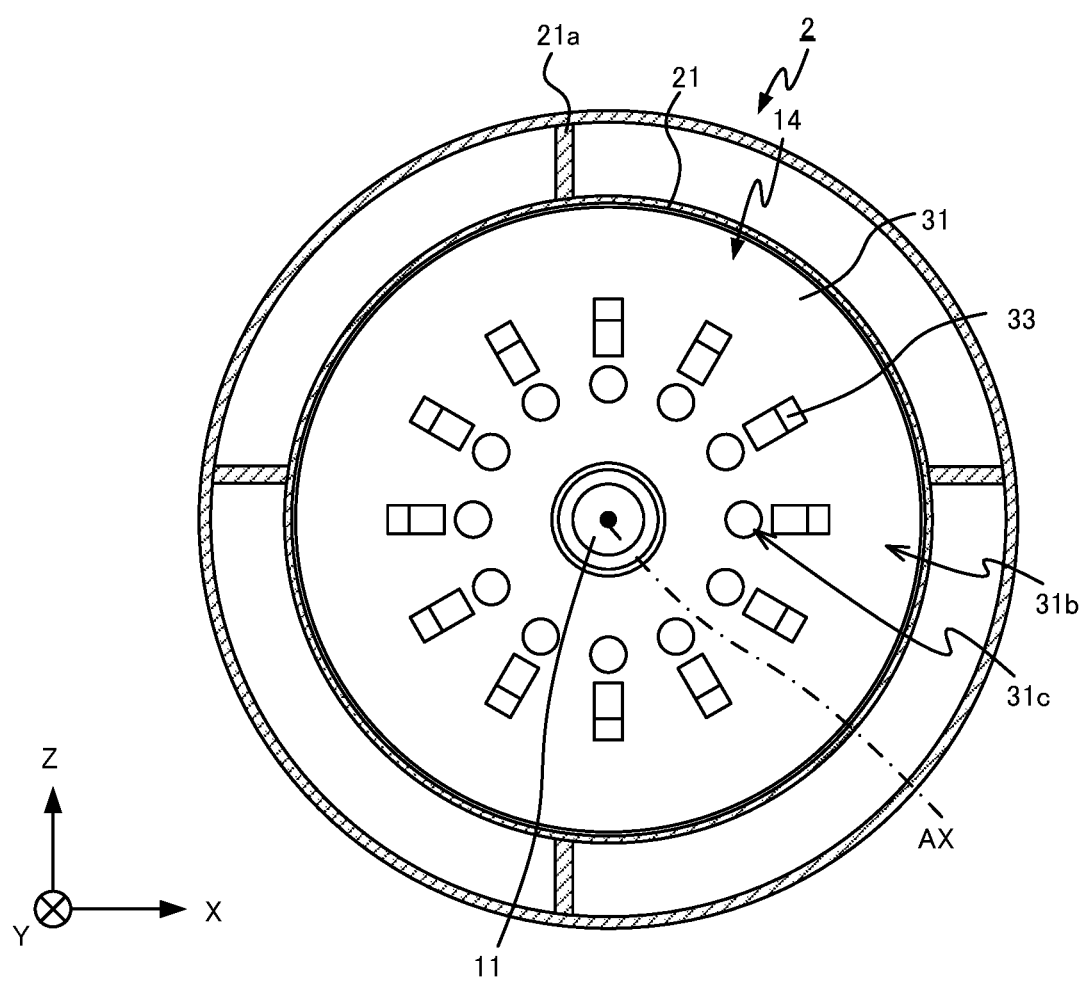
FIG. 8 is a cross-sectional view of the electric motor according to Embodiment 2 taken along line B-B in FIG. 7 as viewed in the direction indicated by arrows.

As illustrated in FIG. 8 that is a cross-sectional view taken along line B-B in FIG. 7 as viewed in the direction indicated by arrows, the fan 14 includes the second blades 33 located circumferentially at intervals. For ease of illustration, the rotor conductors 16 and the stator conductors 18 are not illustrated in FIG. 8.

Airflow in the electric motor 2 with the above structure that occurs when the electric motor 2 is energized is similar to the airflow in the electric motor 1. As in the electric motor 1, the electric motor 2 is cooled by air flowing through the electric motor 2.

As described above, the electric motor 2 according to Embodiment 2 includes the second blades 33 in addition to the components of the electric motor 1, thus facilitating airflow through the first through-holes 31c. As a result, the air flows more smoothly to the second ventilation path 17b than in the electric motor 1. The electric motor 2 has higher cooling efficiency than the electric motor 1.

The flow amount is positively correlated with the length of blades. Thus, when the first blades 32 are radially longer than the second blades 33, the amount of air flowing radially by rotation of the fan 14 is greater than the amount of air flowing through the first through-holes 31c to the second ventilation path 17b. Increasing the rate of air flowing radially by rotation of the fan 14 can suppress air containing foreign objects flowing through the first through-holes 31c.

With the second blades 33 extending toward the second ventilation path 17b, air drawn in through the first through-holes 31c smoothly flows to the second ventilation path 17b. The electric motor 2 thus has high cooling efficiency.

Embodiment 3

In Embodiment 3, another example shape of the fan 14 is described. A fan 14 further includes a cylinder located radially outward from the second blades 33 and extending from the second main surface 31b of the vane 31.

Figure 9:
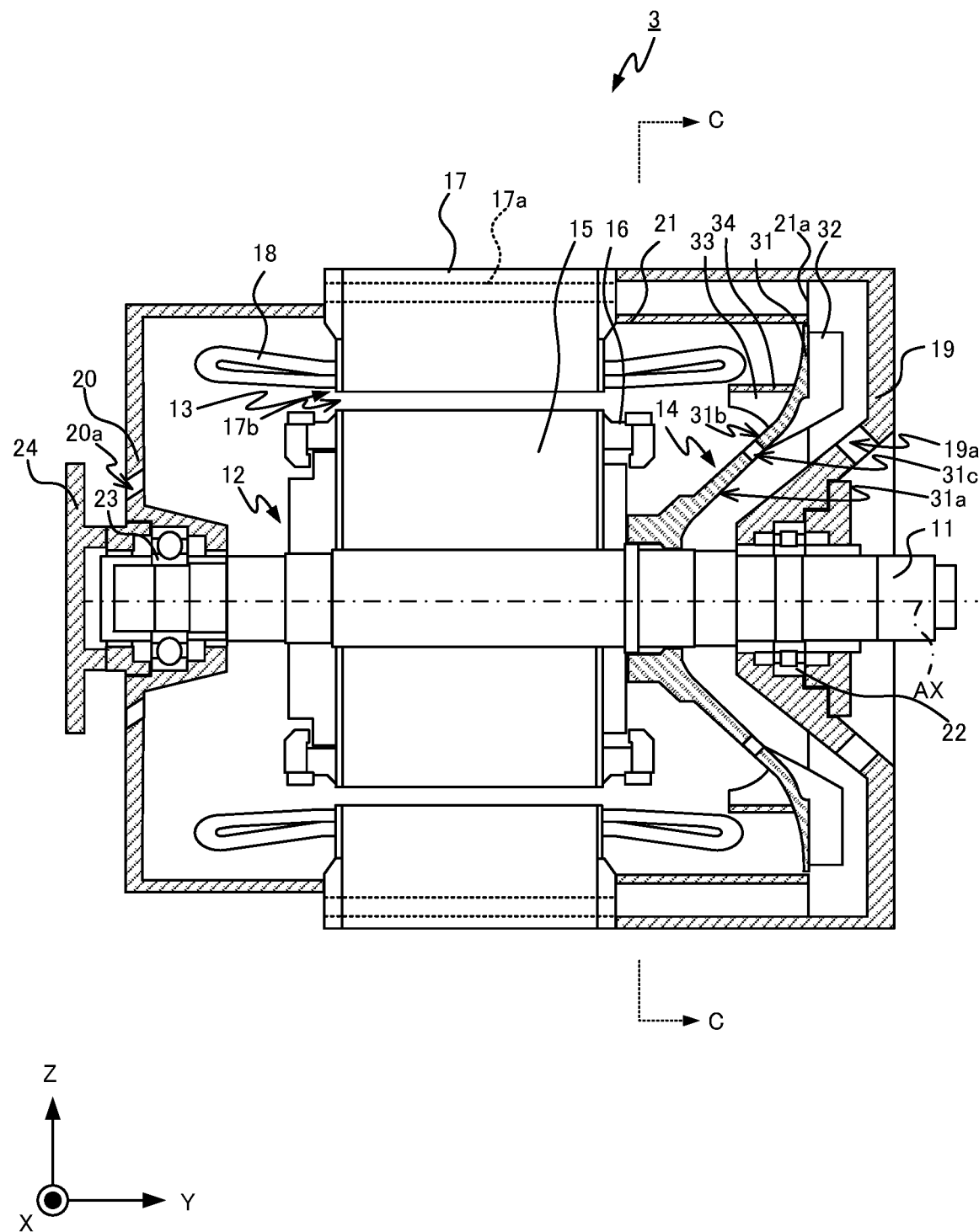
FIG. 9 is a cross-sectional view of an electric motor according to Embodiment 3.
Figure 10:
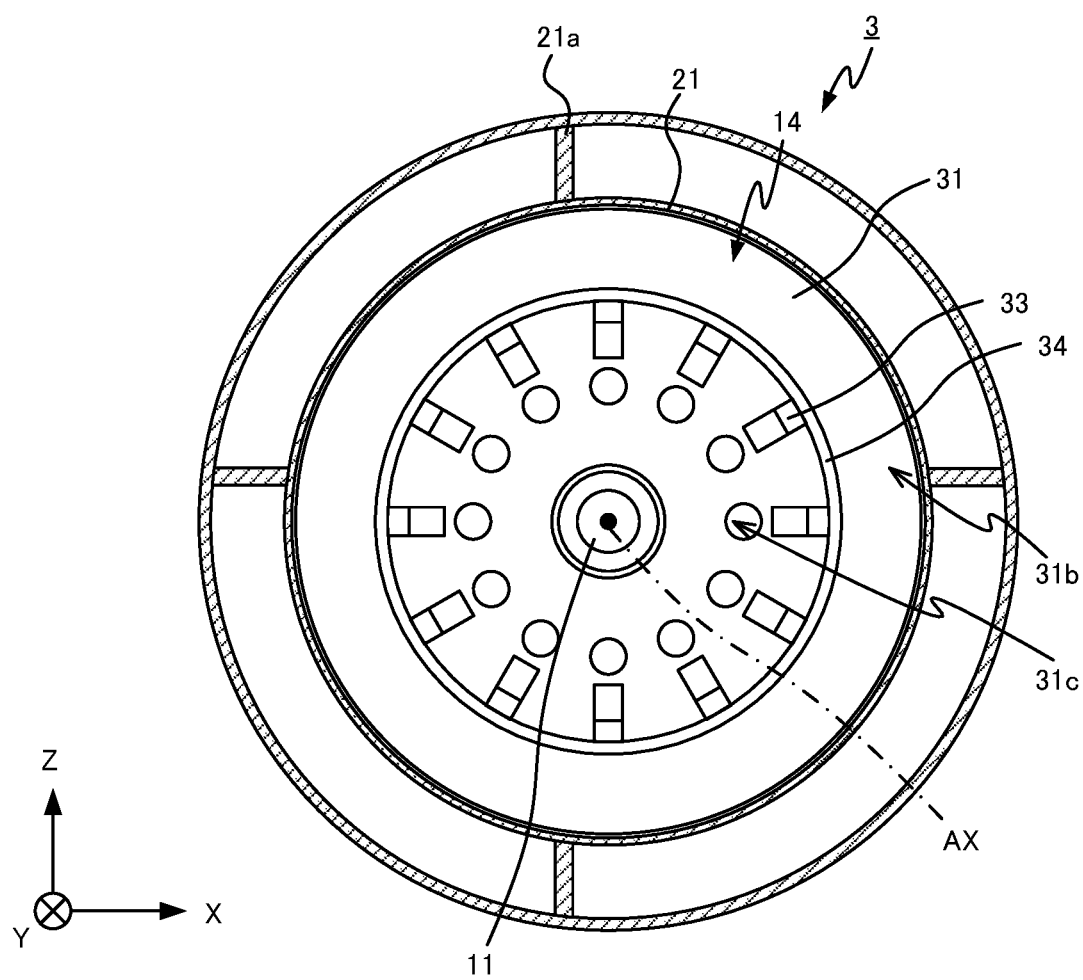
FIG. 10 is a cross-sectional view of the electric motor according to Embodiment 3 taken along line C-C in FIG. 9 as viewed in the direction indicated by arrows.

FIG. 9 illustrates an electric motor 3 including the fan 14 including, in addition to the components of the fan 14 included in the electric motor 2 according to Embodiment 2, a first cylinder 34 fixed to the second main surface 31b of the vane 31 at a position radially outward from the second blades 33 on the second main surface 31b. As illustrated in FIG. 10 that is a cross-sectional view taken along line C-C in FIG. 9 as viewed in the direction indicated by arrows, the first cylinder 34 is preferably a circular cylinder. The first cylinder 34 preferably has an inner circumferential surface in contact with the second blades 33. For ease of illustration, the rotor conductors 16 and the stator conductors 18 are not illustrated in FIG. 10.

Airflow in the electric motor 3 with the above structure that occurs when the electric motor 3 is energized is similar to the airflow in the electric motors 1 and 2. As in the electric motors 1 and 2, the electric motor 3 is cooled by air flowing through the electric motor 3. The fan 14 including the first cylinder 34 allows air drawn in through the first through-holes 31c to flow along the inner circumferential surface of the first cylinder 34 to the second ventilation path 17b.

As described above, in addition to the components of the electric motor 2, the electric motor 3 according to Embodiment 3 includes the first cylinder 34 to allow air flowing through the first through-holes 31c to flow along the inner circumferential surface of the first cylinder 34 to the second ventilation path 17b. This structure can guide air to blow to the second ventilation path 17b to increase the amount of airflow of the second ventilation path 17b. The electric motor 3 thus has higher cooling efficiency than the electric motors 1 and 2.

Embodiment 4

The rotor core 15 may have a ventilation path to further improve the cooling efficiency of the electric motors 1 to 3. In Embodiment 4, an electric motor includes a rotor core 15 with ventilation paths and a fan 14 with a shape different from the shape of the fan 14 in each of the electric motors 1 to 3.

Figure 11:
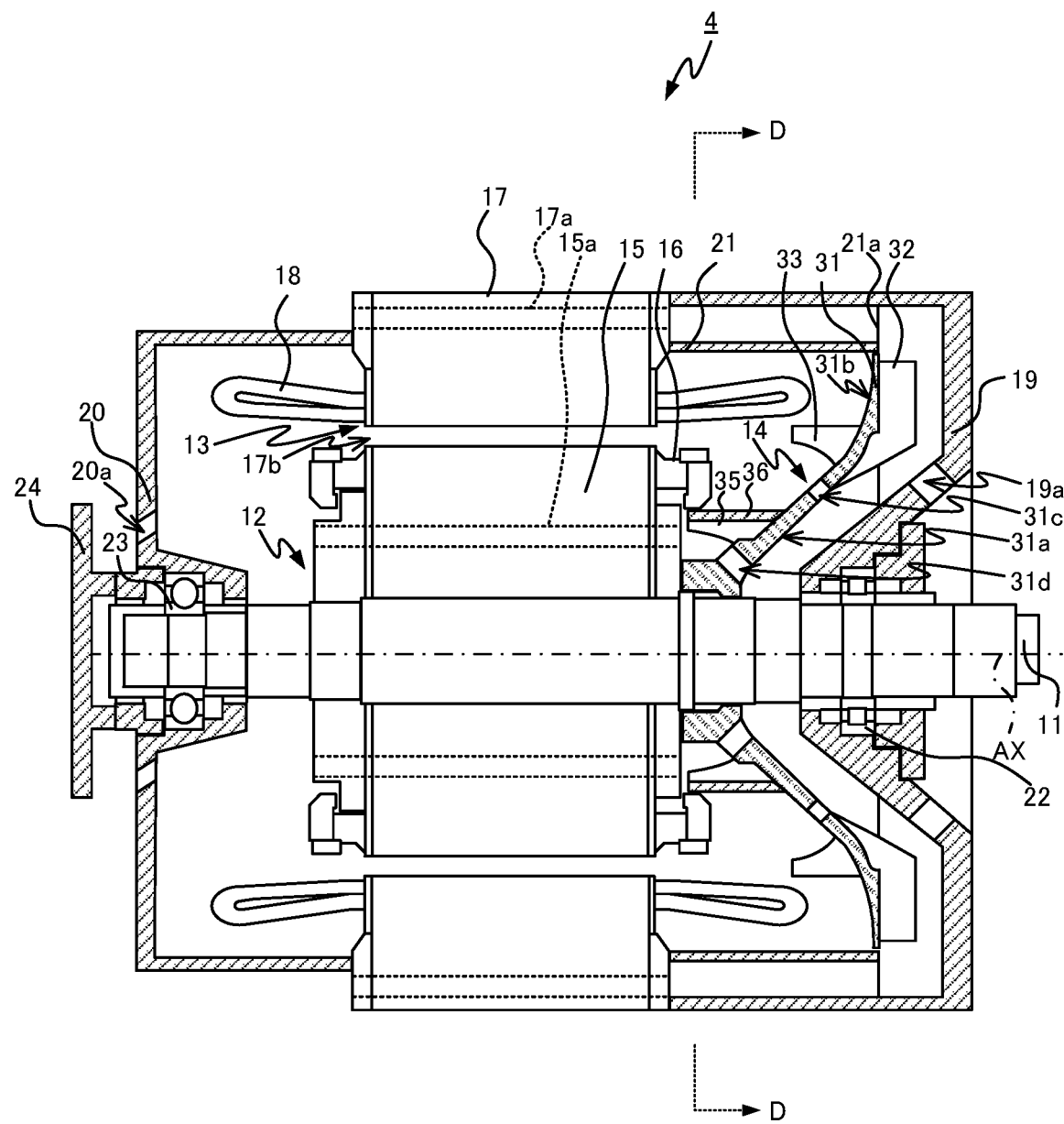
FIG. 11 is a cross-sectional view of an electric motor according to Embodiment 4.

FIG. 11 illustrates an electric motor 4 including the rotor core 15 having third ventilation paths 15a. The third ventilation path 15a penetrates through the rotor core 15 in the rotation axis AX direction. In addition to the components of the fan 14 included in the electric motor 2 according to Embodiment 2, the fan 14 included in the electric motor 4 further has second through-holes 31d penetrating through the vane 31 at positions radially inward from the first through-holes 31c in the vane 31.

The fan 14 also includes third blades 35 fixed to the second main surface 31b at positions radially outward from the second through-holes 31d and radially inward from the first through-holes 31c. The third blades 35 extend away from the second main surface 31b. The third blades 35 fixed to the second main surface 31b include the third blades 35 formed separately from the vane 31 and fixed to the second main surface 31b by, for example, welding or bonding, and the third blades 35 formed integrally with the vane 31.

The third blades 35 preferably extend toward the third ventilation paths 15a.

Figure 12:
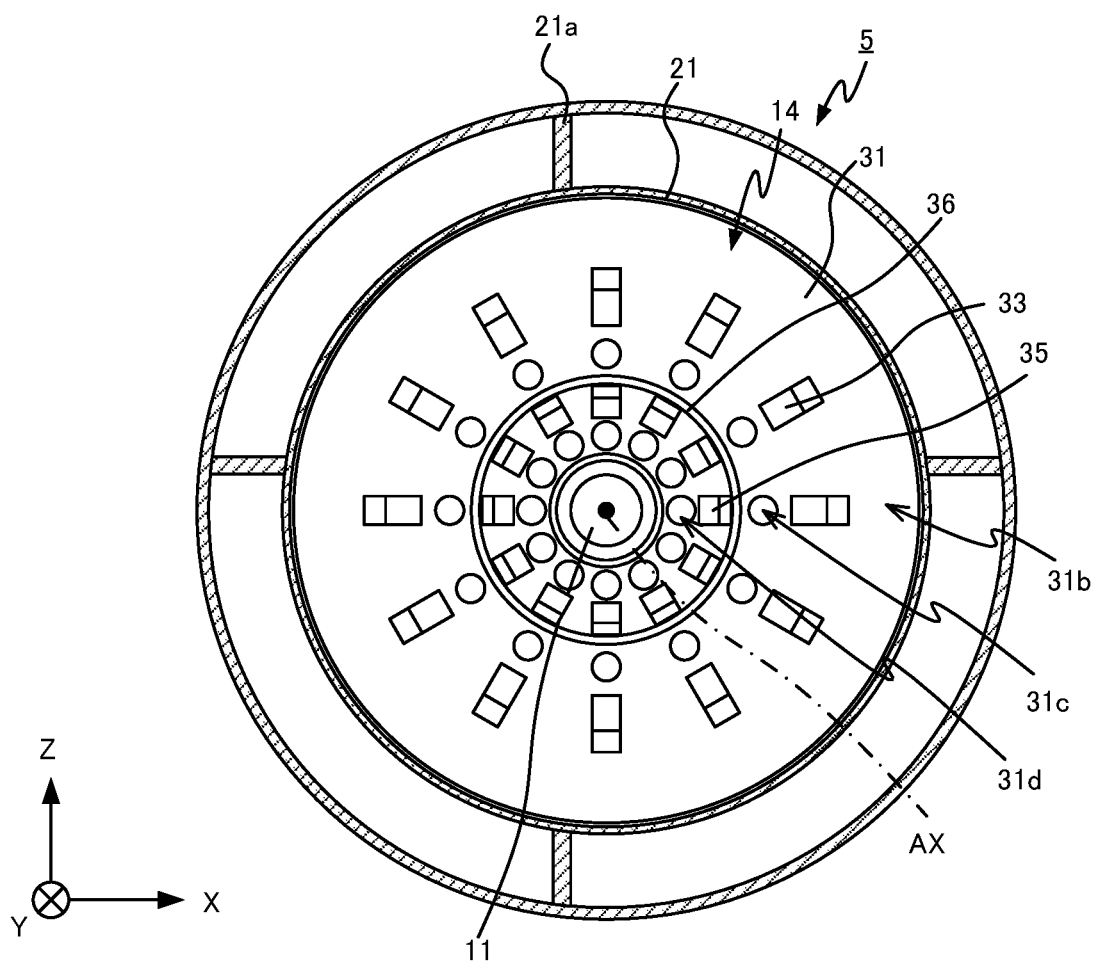
FIG. 12 is a cross-sectional view of the electric motor according to Embodiment 4 taken along line D-D in FIG. 11 as viewed in the direction indicated by arrows.

More specifically, as illustrated in FIG. 12 that is a cross-sectional view taken along line D-D in FIG. 11 as viewed in the direction indicated by arrows, the fan 14 includes the third blades 35 located circumferentially at intervals. For ease of illustration, the rotor conductors 16 and the stator conductors 18 are not illustrated in FIG. 12.

As illustrated in FIG. 11, the fan 14 also includes a second cylinder 36 fixed to the second main surface 31b of the vane 31 at a position radially outward from the third blades 35. More specifically, the second cylinder 36 is located radially outward from the third blades 35 and radially inward from the first through-holes 31c. As illustrated in FIG. 12, the second cylinder 36 is preferably a circular cylinder. The inner circumferential surface of the second cylinder 36 is preferably in contact with the third blades 35.

When the electric motor 4 with the above structure are energized to rotate the rotor core 15 and the shaft 11 integrally, the fan 14 rotates together with the shaft 11 to draw air outside the electric motor 4 through the inlets 19a into a space defined between the inner circumferential surface of the first bracket 19 and the first main surface 31a of the vane 31.

Figure 13:
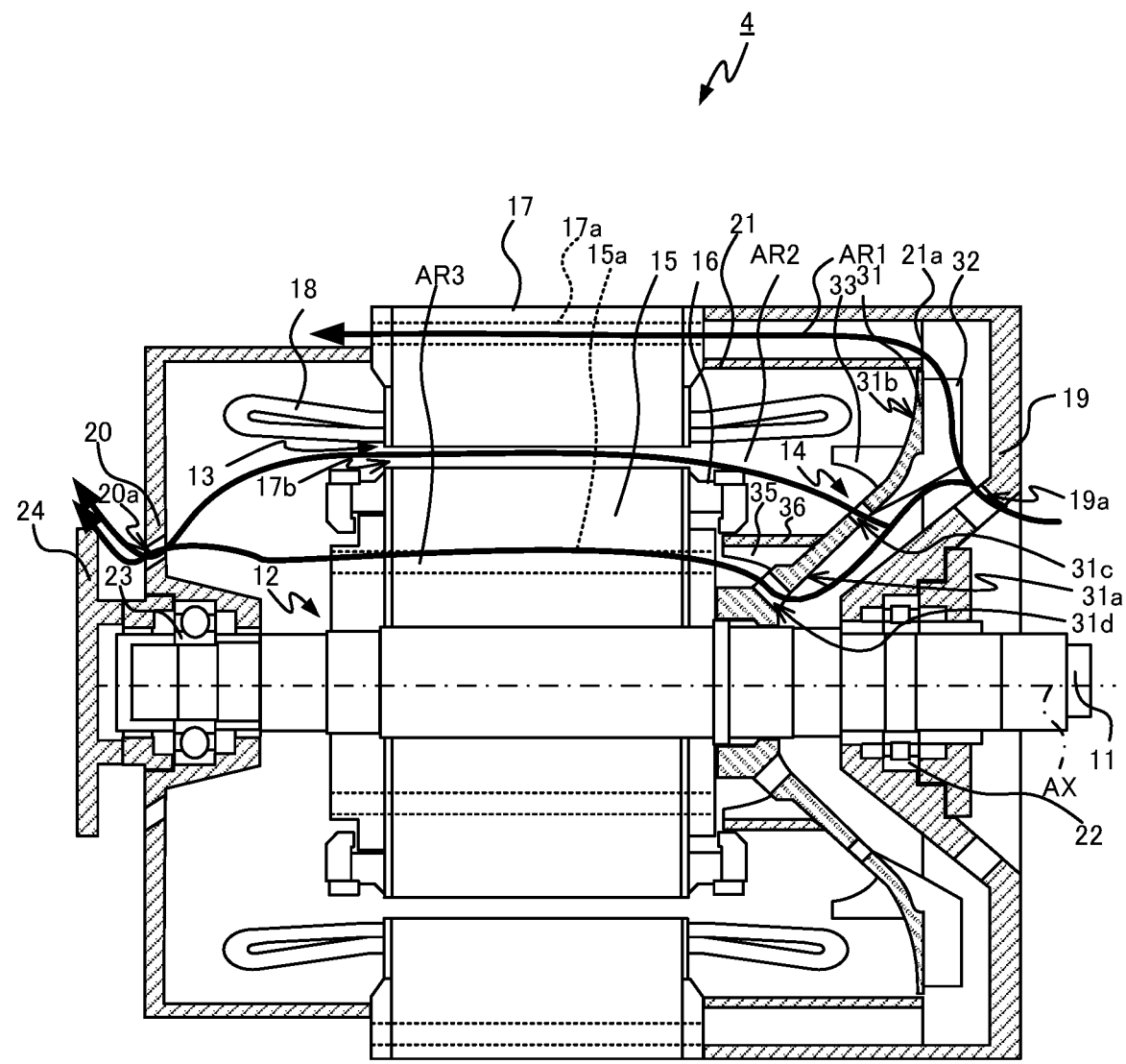
FIG. 13 is a diagram illustrating an airflow in the electric motor according to Embodiment 4.
Figure 13:
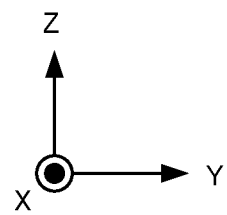

FIG. 13 illustrates airflow in the electric motor 4 with arrows AR1, AR2, and AR3. Airflow indicated by arrows AR1 and AR2 is similar to the airflow in Embodiments 1 to 3. Since the centrifugal force acts on the foreign objects, the air from which the foreign objects is removed, as indicated by arrow AR3, flows through the second through-holes 31*d* located radially inward from the first blades 32 and reaches the third ventilation paths 15*a* in the rotor core 15. As indicated by arrow AR3, the air reaching the third ventilation path 15*a* passes through the third ventilation path 15*a* to flow out through the first outlets 20*a*. As indicated by arrows AR1, AR2, and AR3, the electric motor 4 is cooled by air flowing through the electric motor 4. The fan 14 including the second cylinder 36 allows air passing through the second through-holes 31*d* to flow along the inner circumferential surface of the second cylinder 36 to the third ventilation paths 15*a*.

As described above, the electric motor 4 according to Embodiment 4 is cooled by air flowing through the electric motor 4 as indicated by arrows AR1, AR2, and AR3 in FIG. 13. As indicated by arrow AR2, air flowing near the rotor conductors 16 and the stator conductors 18 is the air from which foreign objects are removed by rotation of the fan 14. This reduces foreign objects coming in contact with the rotor conductors 16 and the stator conductors 18, reducing failures of the electric motor 4 occurring due to foreign objects.

The fan 14 included in the electric motor 4 includes the third blades 35, the second cylinder 36, and the second through-holes 31*d*. Thus, as indicated by arrow AR3, air flows through the third ventilation paths 15*a* formed in the rotor core 15. The electric motor 4 thus has higher cooling efficiency than the electric motors 1 to 3. Air flowing through the third ventilation path 15*a* is the air from which foreign objects are removed by rotation of the fan 14, thus reducing the likelihood of the third ventilation paths 15*a* in the rotatable rotor core 15 being clogged with foreign objects. The electric motor 4 is thus suppressed to have higher ventilation resistance and lower cooling efficiency.

With the third blades 35 extending toward the third ventilation path 15*a*, air drawn in through the second through-holes 31*d* smoothly flows to the third ventilation paths 15*a*. Thus, the electric motor 4 has lower ventilation resistance and higher cooling efficiency.

Embodiment 5

Each of the electric motors 1 to 4 may include a cylinder to allow air to smoothly flow to the second ventilation path 17*b*. For example, in Embodiment 5, an electric motor includes, in addition to the components of the electric motor 1, a cylinder to allow air to smoothly flow to the second ventilation path 17*b*.

Figure 14:
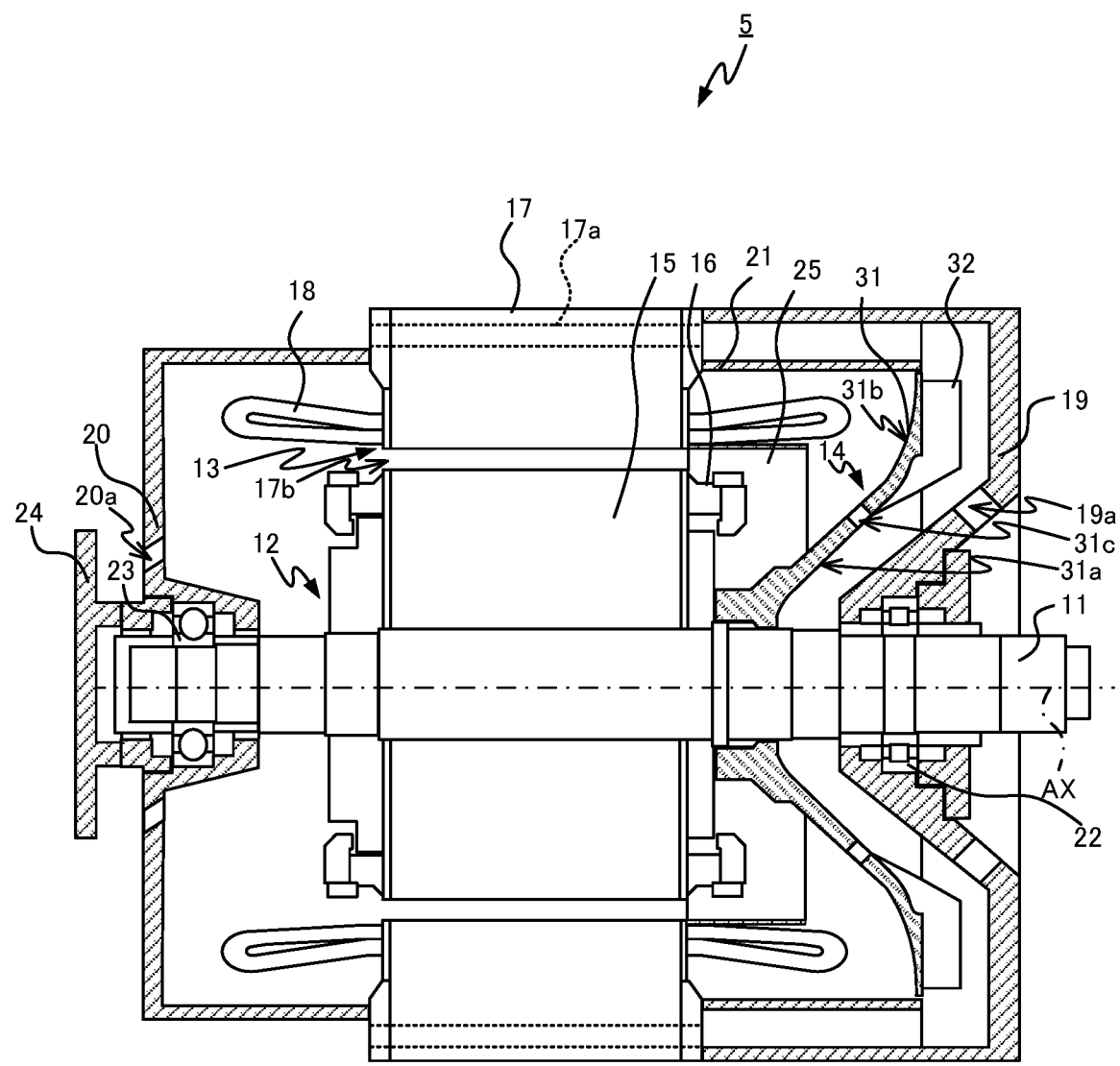
FIG. 14 is a cross-sectional view of an electric motor according to Embodiment 5.

FIG. 14 illustrates an electric motor 5 according to Embodiment 5 including, in addition to the components of the electric motor 1, a third cylinder 25 fixed to the surface of the stator core 17 facing the first bracket 19. The third cylinder 25 is fixed to the surface of the stator core 17 facing the first bracket 19 by, for example, welding or bonding. The outer circumferential surface of the third cylinder 25 is located radially inward from the stator conductors 18. The third cylinder 25 guides air passing through the first through-holes 31*c* to the second ventilation path 17*b*. The third cylinder 25 is preferably a circular cylinder.

Airflow in the electric motor 5 with the above structure that occurs when the electric motor 5 is energized is similar to the airflow in the electric motor 1. As in the electric motor 1, the electric motor 5 is cooled by air flowing through the electric motor 5.

As described above, the electric motor 5 according to Embodiment 5 includes the third cylinder 25 in addition to the components of the electric motor 1, thus allowing air passing through the first through-holes 31*c* to smoothly flow to the second ventilation path 17*b*. The electric motor 5 allows air to flow to the second ventilation path 17*b* more smoothly than the electric motors 1 to 4. Thus, the electric motor 5 has lower ventilation resistance and higher cooling efficiency.

Embodiment 6

The stator core 17 may also have a ventilation path to further improve the cooling efficiency of the electric motors 1 to 5. In Embodiment 6, an electric motor includes a stator core 17 having a ventilation path in addition to the first ventilation path 17*a* and a fan 14 with a shape different from the shape of the fan 14 in each of the electric motors 1 to 5.

Figure 15:
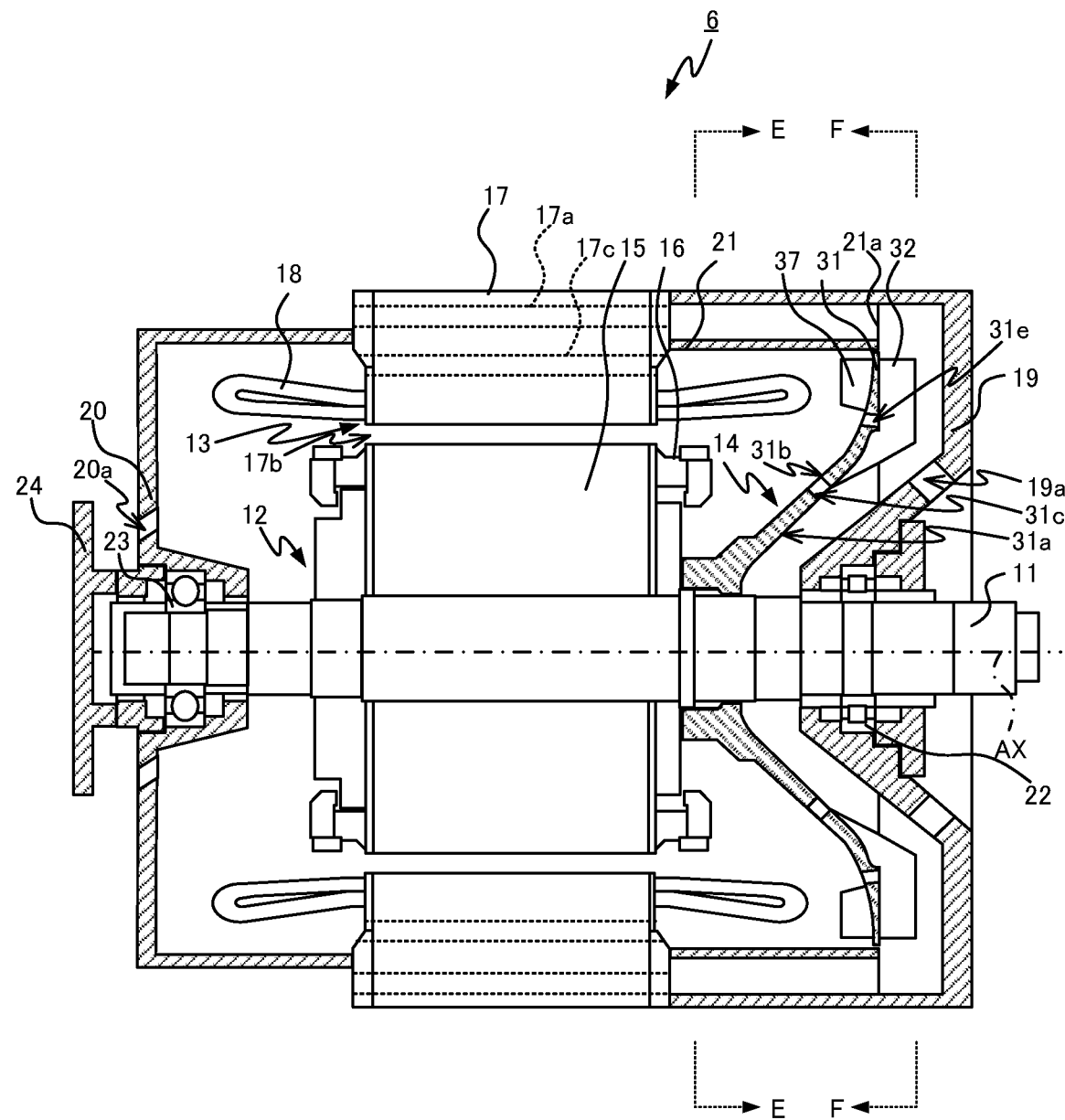
FIG. 15 is a cross-sectional view of an electric motor according to Embodiment 6.
Figure 15:
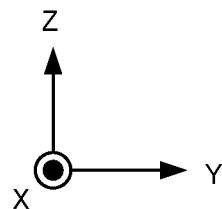

FIG. 15 illustrates an electric motor 6 including a stator core 17 including the first ventilation path 17*a* and a fourth ventilation paths 17*c* being a through-hole. The fourth ventilation paths 17*c* is located radially inward from the first ventilation paths 17*a* and extends in the rotation axis AX direction and penetrates through the stator core 17. The fourth ventilation path 17*c* has one end facing the first bracket 19 located radially inward from the inner circumferential surface of the first guide 21, and the other end located radially inward from the inner circumferential surface of the second bracket 20.

In addition to the components of the fan 14 in the electric motor 1 according to Embodiment 1, the fan 14 included in the electric motor 6 includes fourth blades 37 fixed to the second main surface 31*b* of the vane 31 adjacent to the outer edge of the second main surface 31*b*. The fourth blades 37 extend away from the second main surface 31*b*. The fan 14 also has third through-holes 31*e* penetrating through the vane 31 adjacent to the outer edge of the vane 31.

Figure 16:
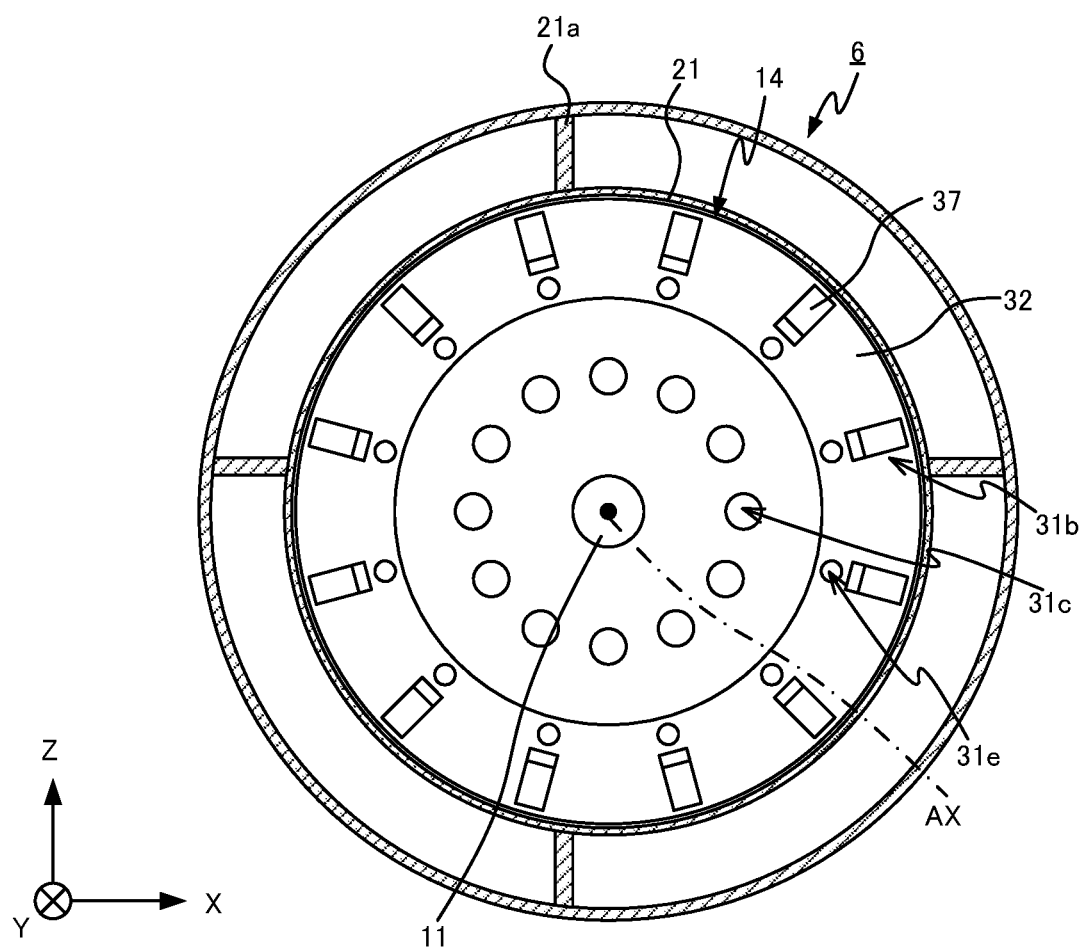
FIG. 16 is a cross-sectional view of the electric motor according to Embodiment 6 taken along line E-E in FIG. 15 as viewed in the direction indicated by arrows.
Figure 17:
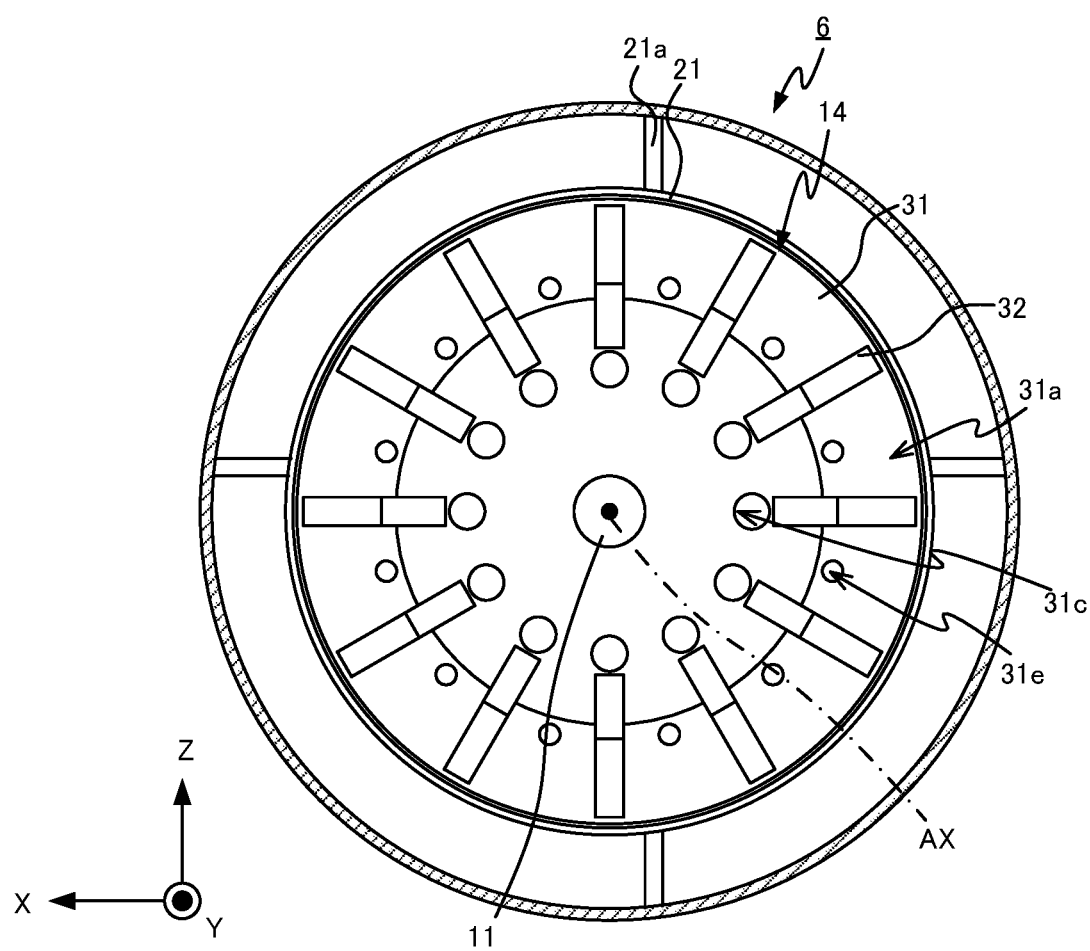
FIG. 17 is a cross-sectional view of the electric motor according to Embodiment 6 taken along line F-F in FIG. 15 as viewed in the direction indicated by arrows.

As illustrated in FIG. 16 that is a cross-sectional view taken along line E-E in FIG. 15 as viewed in the direction indicated by arrows, the fan 14 includes the fourth blades 37 located circumferentially at intervals. For ease of illustration, the rotor conductors 16 and the stator conductors 18 are not illustrated in FIG. 16. As illustrated in FIG. 16 and in FIG. 17 that is a cross-sectional view taken along line F-F in FIG. 15 as viewed in the direction indicated by arrows, the vane 31 included in the fan 14 has the third through-holes 31*e* located circumferentially at intervals. The third through-holes 31*e* are located radially outward from the first through-holes 31*c* in the vane 31 and radially inward from the outer edge of the vane 31. More specifically, the third through-holes 31*e* penetrate through the vane 31 from positions radially inward from and adjacent to the first blades 32 to positions radially inward from and adjacent to the fourth blades 37. For ease of illustration, the bearing 22 and the surface of the first bracket 19 intersecting with the rotation axis AX are not illustrated in FIG. 17.

When the electric motor 6 with the above structure is energized to rotate the rotor core 15 and the shaft 11 integrally, the fan 14 rotates together with the shaft 11 to draw air outside the electric motor 6 through the inlets 19*a*.

Figure 18:
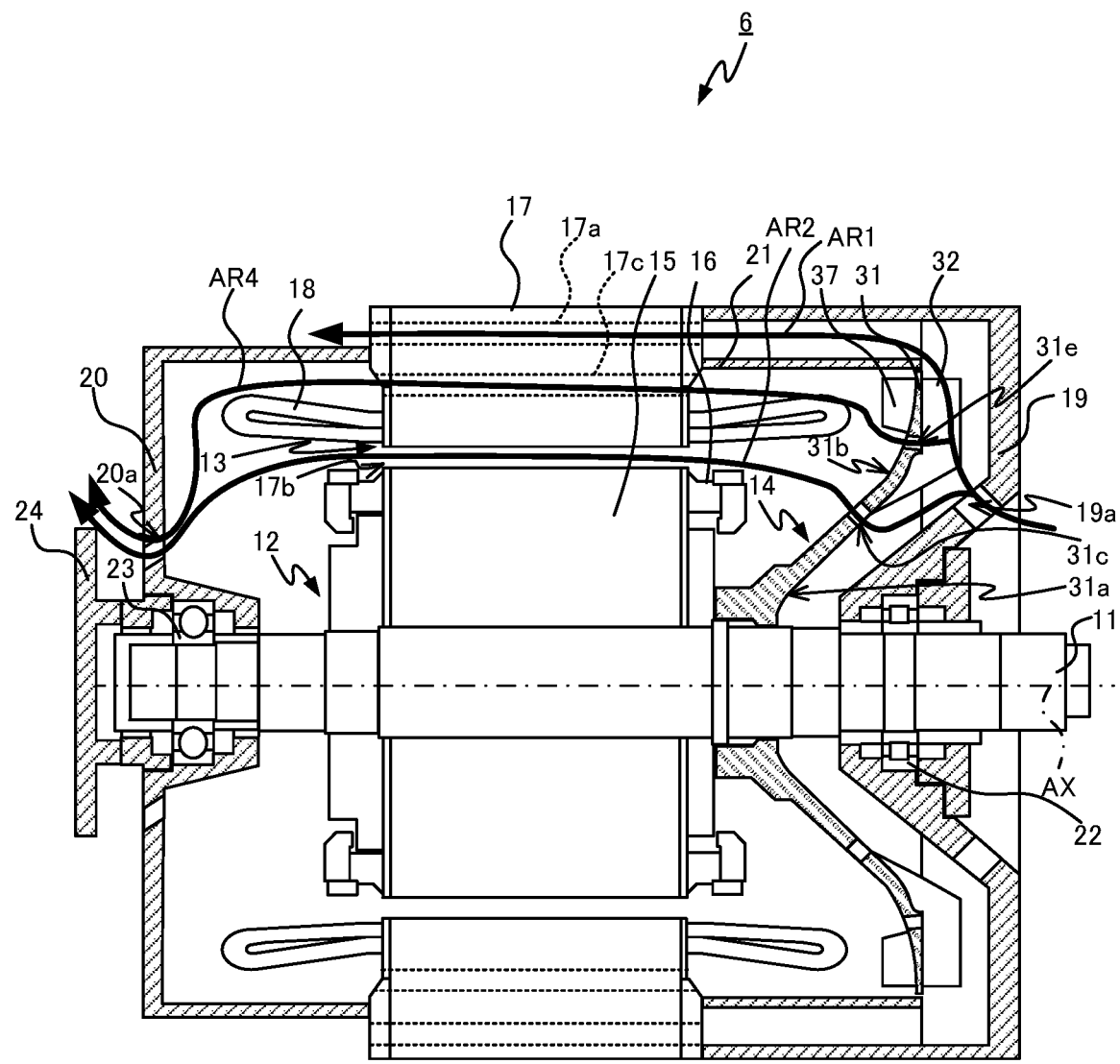
FIG. 18 is a diagram illustrating an airflow in the electric motor according to Embodiment 6.

FIG. 18 illustrates airflow with arrows AR1, AR2, and AR4. Airflow indicated by arrows AR1 and AR2 is similar to the airflow in Embodiment 1. The fan 14 rotates to generate centrifugal force acting on the foreign objects. The air from which the foreign objects are removed thus enter the fourth ventilation paths 17*c*. A portion of the air from which foreign objects are removed reaches the fourth ventilation paths 17c as indicated by arrow AR4. As indicated by arrow AR4, air reaching the fourth ventilation paths 17c passes through the fourth ventilation paths 17c to flow out through the first outlets 20a. As indicated by arrows AR1, AR2, and AR4, the electric motor 6 is cooled by air flowing through the electric motor 6.

As described above, the electric motor 6 according to Embodiment 6 is cooled by air flowing through the electric motor 6 as indicated by arrows AR1, AR2, and AR4 in FIG. 18. As indicated by arrow AR4, air flows through the fourth ventilation paths 17c in the stator core 17. Thus, the electric motor 6 has further improved cooling efficiency. Air flowing through the fourth ventilation paths 17c is the air from which foreign objects are removed by rotation of the fan 14, thus reducing the likelihood of the fourth ventilation paths 17c being clogged with foreign objects. The electric motor 6 is thus less likely to have higher ventilation resistance and lower cooling efficiency.

Embodiment 7

The electric motors 1 to 6 according to Embodiments 1 to 6 are frameless electric motors, but may be electric motors with frames. In Embodiment 7, an electric motor with a frame is described.

Figure 19:
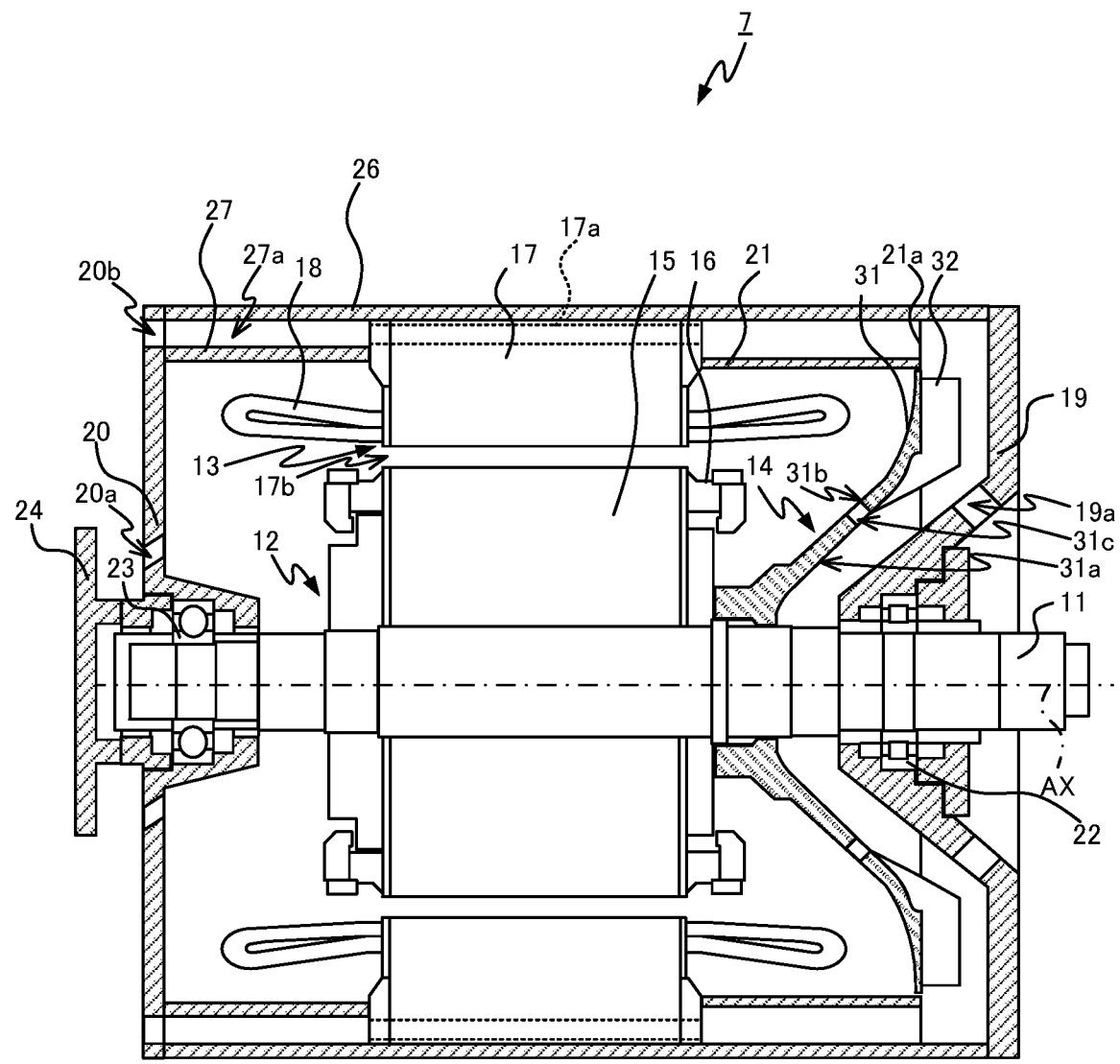
FIG. 19 is a cross-sectional view of an electric motor according to Embodiment 7.

FIG. 19 illustrates an electric motor 7 according to Embodiment 7 including, in addition to the components of the electric motor 1, a cylindrical frame 26 accommodating the shaft 11, the rotor 12, and the stator 13, and a second guide 27 defining a channel with the inner circumferential surface of the frame 26.

Figure 20:
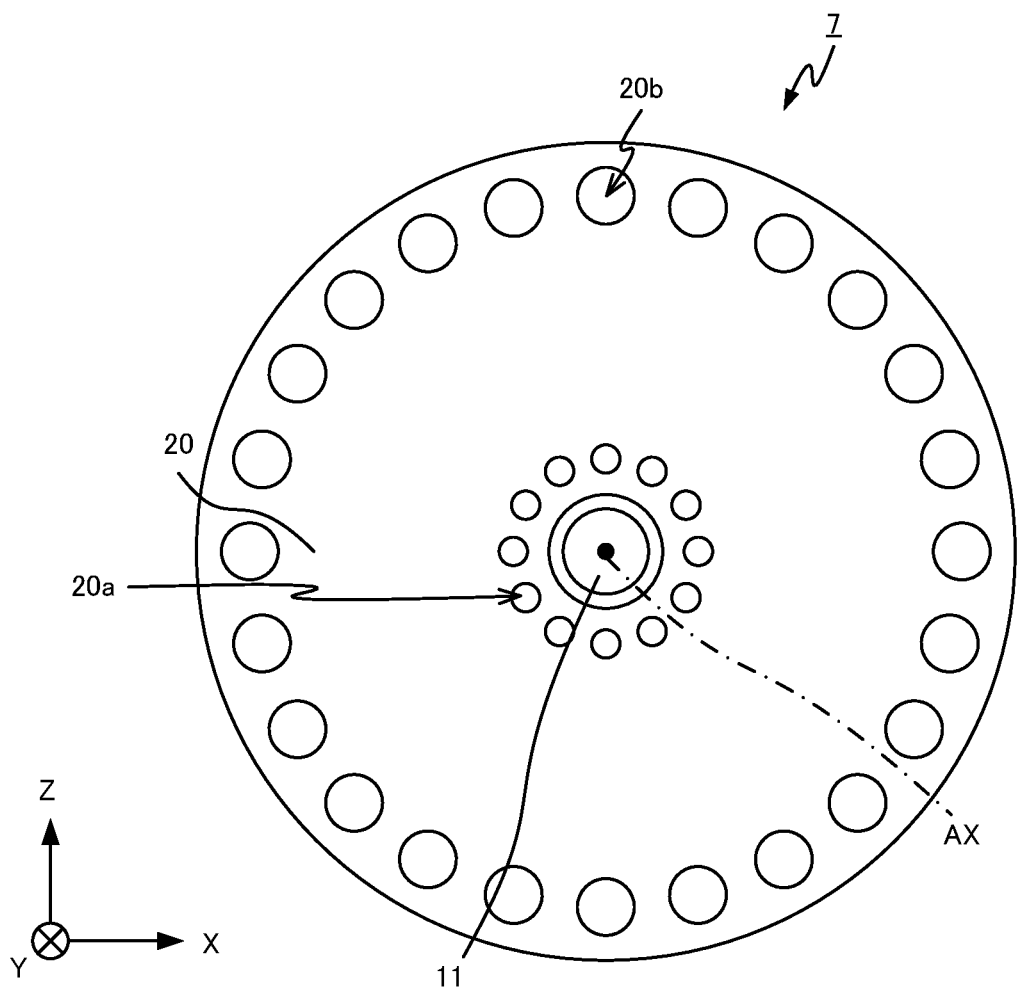
FIG. 20 is a side view of the electric motor according to Embodiment 7.

The electric motor 7 is described in detail by focusing on the difference from the electric motor 1. As illustrated in FIG. 20 illustrating the electric motor 7 as viewed in the positive Y-direction, the second bracket 20 includes, in addition to the first outlets located circumferentially at intervals, multiple second outlets 20b located circumferentially at intervals radially outward from the first outlets 20a. The electric motor 7 as viewed in the negative Y-direction is similar to the electric motor illustrated in FIG. 3.

The frame 26 is held between the first bracket 19 and the second bracket 20. The stator core 17 is fixed to the inner circumferential surface of the frame 26.

The second guide 27 is cylindrical and in contact with the stator core 17 and the second bracket 20. The outer circumferential surface of the second guide 27 is located radially inward from the second outlet 20b. The second guide 27 defines, with the frame 26, an outlet path 27a extending from the other end of the first ventilation path 17a to the second outlet 20b. The second guide 27 is preferably a circular cylinder.

When the electric motor 7 with the above structure is energized to rotate the rotor core 15 and the shaft 11 integrally, the fan 14 rotates together with the shaft 11 to draw air outside the electric motor 7 into the electric motor 7 through the inlets 19a.

Figure 21:
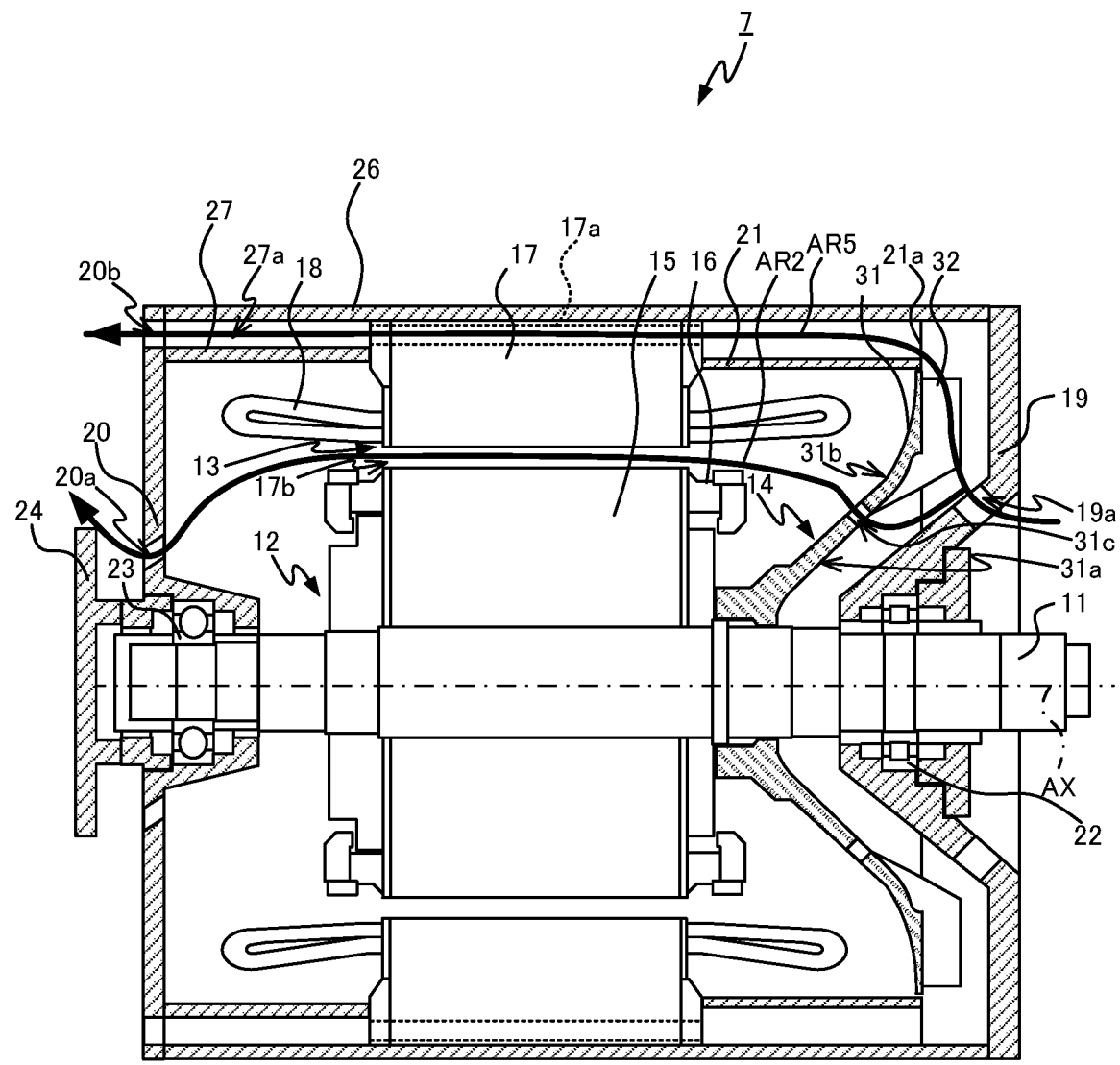
FIG. 21 is a diagram illustrating an airflow in the electric motor according to Embodiment 7.
Figure 21:
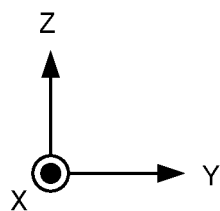

FIG. 21 illustrates airflow in the electric motor 7 with arrows AR2 and AR5. Airflow indicated by arrow AR2 is similar to the airflow in Embodiments 1 to 6. Centrifugal force acts on the foreign objects contained in the air to cause a portion of the air containing the foreign objects to flow radially as indicated by arrow AR5 to the first ventilation paths 17a as guided by the first guide 21. The air guided to one end of the first ventilation path 17a flows through the first ventilation path 17a to the outlet path 27a through the other end of the first ventilation path 17a. The air passing through the outlet path 27a flows out through the second outlet 20b.

As described above, as indicated by arrows AR2 and AR5 in FIG. 21, the electric motor 7 according to Embodiment 7 is cooled by air flowing through the framed electric motor 7. As indicated by arrow AR2, air flowing near the rotor conductors 16 and the stator conductors 18 is the air from which foreign objects are removed by rotation of the fan 14. This suppresses foreign objects coming in contact with the rotor conductors 16 and the stator conductors 18, reducing failures of the electric motor 7 occurring due to foreign objects.

The present disclosure is not limited to the above embodiments. Any combination of two or more of the above embodiments may be made. For example, the stator core 17 in each of the electric motors 1 to 5 and 7 may have the fourth ventilation paths 17c. The fan 14 in the electric motor 7 may have the same shape as the fan 14 in each of the electric motors 2 to 6.

The components of each of the electric motors 1 to 7 may have shapes other than those in the above examples. The fan 14 may have any shape that allows a portion of the air containing foreign objects to flow radially and allows another portion of the air from which foreign objects are removed to flow to the second ventilation path 17b. For example, the fan 14 may include the vane 31, the first blades 32, and the third blades 35.

A second blade 33 and a third blade 35 may be included in a single blade. In this case, each of the first through-holes 31c may be circumferentially located between adjacent blades each including the second blade 33 and the third blade 35.

The fan 14 may include the vane 31, the first blades 32, the second blades 33, the third blades 35, the first cylinder 34, and the second cylinder 36.

The fan 14 may include the vane 31 having the first through-holes 31c and the second through-holes 31d, and the first blades 32.

The fan 14 may include the vane 31 having the first through-holes 31c and the third through-holes 31e, and the first blades 32.

The fan 14 may include the vane 31 having the first through-holes 31c and the second through-holes 31d, the first blades 32, and the third blades 35.

The fan 14 may include any number of first blades 32, any number of second blades 33, and any number of third blades 35.

The first through-holes 31c may each have any shape that has one end on the first main surface 31a and the other end on the second main surface 31b.

The second through-holes 31d may each have any shape that has one end on the first main surface 31a and the other end on the second main surface 31b.

The third through-holes 31e may each have any shape that has one end on the first main surface 31a and the other end on the second main surface 31b.

The fan 14 may have any number of first through-holes 31c, any number of second through-holes 31d, and any number of third through-holes 31e.

As illustrated in FIG. 2, the fan 14 in the electric motor 1 according to Embodiment 1 includes the first blades 32 and the first through-holes 31c that are equal in number and are located circumferentially at regular intervals, but the fan 14 may have another shape. In one example, the number of first blades 32 may be different from the number of first through-holes 31c. In another example, the first blades 32 may be located circumferentially at irregular intervals. Similarly, the first through-holes 31c may be located circumferentially at irregular intervals.

In the example of FIG. 2, each first blade 32 and the corresponding first through-hole 31c are located on the same straight line extending radially outward from the rotation axis AX, but may not be located on the same straight line extending radially outward from the rotation axis AX.

Similarly, as illustrated in FIG. 16, the fan 14 included in the electric motor 6 according to Embodiment 6 includes the fourth blades 37 and the third through-holes 31e that are equal in number and are located circumferentially at regular intervals, but the fan 14 may have another shape. In one example, the number of fourth blades 37 may be different from the number of third through-holes 31e. In another example, the fourth blades 37 may be located circumferentially at irregular intervals. Similarly, the third through-holes 31e may be located circumferentially at irregular intervals.

In the example of FIG. 16, each fourth blade 37 and the corresponding third through-hole 31e are located on the same straight line extending radially outward from the rotation axis AX, but may not be located on the same straight line extending radially outward from the rotation axis AX.

In the example illustrated in FIG. 16, the third through-holes 31e are located radially inward from the fourth blades 37, but may be located at different positions. For example, the third through-holes 31e may be each located circumferentially between adjacent fourth blades 37.

The first ventilation paths 17a may each extend in the direction other than the rotation axis AX direction, and may have any shape that has one end on the surface facing the first bracket 19 and the other end on the surface facing outside. For example, the first ventilation paths 17a may each extend in the direction intersecting with the rotation axis AX.

The third ventilation paths 15a may each extend in the direction other than the rotation axis AX direction, and may have any shape that has one end on the surface facing the first bracket 19 and the other end on the surface facing the second bracket 20. For example, the third ventilation paths 15a may each extend in the direction intersecting with the rotation axis AX.

The fourth ventilation paths 17c may extend in the direction other than the rotation axis AX direction, and may have any shape that has one end on the surface facing the first bracket 19 and the other end on the surface facing the second bracket 20. For example, the fourth ventilation path 17c may extend in the direction intersecting with the rotation axis AX.

The first guide 21 may have any shape to guide air containing foreign objects to the first ventilation paths 17a. For example, the first guide 21 may be fixed with any number of fixing members 21a at any position. The first guide 21 may be fixed to the first bracket 19 with any method.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST 1, 2, 3, 4, 5, 6, 7 Electric motor
11 Shaft
12 Rotor
13 Stator
14 Fan
15 Rotor core
15a Third ventilation path
16 Rotor conductor
17 Stator core
17a First ventilation path
17b Second ventilation path
17c Fourth ventilation path
18 Stator conductor
19 First bracket
19a Inlet
20 Second bracket
20a First outlet
20b Second outlet
21 First guide
21a Fixing member
22, 23 Bearing
24 Shielding plate
25 Third cylinder
26 Frame
27 Second guide
27a Outlet path
31 Vane
31a First main surface
31b Second main surface
31c First through-hole
31d Second through-hole
31e Third through-hole
32 First blade
33 Second blade
34 First cylinder
35 Third blade
36 Second cylinder
37 Fourth blade
211, 311 End portion
212 First recess-protrusion portion
312 Second recess-protrusion portion
AR1, AR2, AR3, AR4, AR5 Arrow
AX Rotation axis

The invention claimed is:
1. An electric motor, comprising:
a shaft supported rotatably about a rotation axis;
a rotor located outward from the shaft in a radial direction of the shaft and rotatable integrally with the shaft;
a stator including a first ventilation path being a through-hole, the stator facing the rotor in the radial direction and defining, with the rotor, a second ventilation path therebetween;
a first bracket including an inlet to draw air into the electric motor from outside;
a fan having a main surface facing the first bracket and rotatable integrally with the shaft, the fan having a first through-hole at a position facing a position inward from the inlet in the first bracket in the radial direction;
a second bracket including a first outlet, the second bracket facing the first bracket across the rotor, the stator, and the fan in a direction of the rotation axis; and a first guide being cylindrical and facing the first bracket, wherein a first portion of the air drawn in through the inlet flows in the radial direction by rotation of the fan without passing through the first through-hole, is guided by the first guide to one end of the first ventilation path, and passes through the first ventilation path to flow outside from another end of the first ventilation path, and a second portion of the air drawn in through the inlet flows through the first through-hole, passes through the second ventilation path, and flows outside from the first outlet.

2. The electric motor according to claim 1, wherein the second bracket has an outer circumferential surface located inward from the first ventilation path in the radial direction.

3. The electric motor according to claim 1, wherein the rotor includes a third ventilation path penetrating through the rotor.

4. The electric motor according to claim 1, wherein the stator further includes a fourth ventilation path located inward from the first ventilation path in the radial direction and penetrating through the stator, and the fourth ventilation path has one end facing the first bracket and located inward from an inner circumferential surface of the first guide in the radial direction.

5. The electric motor according to claim 1, wherein the fan further has a third through-hole at a position adjacent to an outer edge of the fan.

6. The electric motor according to claim 1, further comprising:

a third cylinder fixed to a surface of the stator facing the first bracket, the third cylinder having an outer circumferential surface facing an inner circumferential surface of the first guide.

7. An electric motor, comprising:

a shaft supported rotatably about a rotation axis;

a rotor located outward from the shaft in a radial direction of the shaft and rotatable integrally with the shaft;

a stator including a first ventilation path being a through-hole, the stator facing the rotor in the radial direction and defining, with the rotor, a second ventilation path therebetween;

a first bracket including an inlet to draw air into the electric motor from outside;

a fan having a main surface facing the first bracket and rotatable integrally with the shaft, the fan having a first through-hole at a position facing a position inward from the inlet in the first bracket in the radial direction;

a first guide being cylindrical and facing the first bracket;

a second bracket including a first outlet to allow the air drawn through the inlet to flow outside, the second bracket facing the first bracket across the rotor, the stator, and the fan in a direction of the rotation axis;

a frame being cylindrical and accommodating the stator, the rotor, and the shaft; and a second guide being cylindrical and in contact with the second bracket and the stator, the second guide defining an outlet path with an inner circumferential surface of the frame, wherein the first bracket covers one end of the frame, the second bracket covers another end of the frame, and the second bracket includes a second outlet located outward from a portion of the second bracket in contact with the second guide in the radial direction to allow the air drawn in through the inlet to flow outside.

8. The electric motor according to claim 7, wherein the air drawn in through the inlet flows in the radial direction by rotation of the fan, is guided by the first guide to one end of the first ventilation path, and passes through the first ventilation path and the outlet path to flow outside from the second outlet.

9. An electric motor, comprising:

a shaft supported rotatably about a rotation axis;

a rotor located outward from the shaft in a radial direction of the shaft and rotatable integrally with the shaft;

a stator including a first ventilation path being a through-hole, the stator facing the rotor in the radial direction and defining, with the rotor, a second ventilation path therebetween;

a first bracket including an inlet to draw air into the electric motor from outside;

a fan having a main surface facing the first bracket and rotatable integrally with the shaft the fan having a first through-hole at a position facing a position inward from the inlet in the first bracket in the radial direction; and a first guide being cylindrical and facing the first bracket, wherein the fan includes a vane fixed to the shaft, the vane being annular and having the first through-hole, and a first blade fixed to a first main surface of the vane at a position outward from the first through-hole in the first main surface in the radial direction, the first blade extending away from the first main surface.

10. The electric motor according to claim 9, wherein the first bracket includes the inlet facing the first blade.

11. The electric motor according to claim 9, wherein the fan further includes a fourth blade fixed to a second main surface of the vane opposite to the first main surface at a position adjacent to an outer edge of the second main surface, and the fourth blade extends away from the second main surface.

12. The electric motor according to claim 9, further comprising:

a second blade fixed to a second main surface of the vane opposite to the first main surface at a position outward from the first through-hole in the second main surface in the radial direction, the second blade extending away from the second main surface.

13. The electric motor according to claim 12, wherein the first blade is longer than the second blade in the radial direction.

14. The electric motor according to claim 12, wherein the fan further includes a first cylinder fixed to the second main surface of the vane at a position outward from the second blade on the second main surface in the radial direction.

15. The electric motor according to claim 9, wherein the fan further has a second through-hole located inward from the first through-hole in the radial direction.

16. The electric motor according to claim 15, wherein the fan further includes a third blade fixed to a second main surface of the vane opposite to the first main surface at a position outward from the second through-hole and inward from the first through-hole in the radial direction, and the third blade extends away from the second main surface.

17. The electric motor according to claim 16, wherein the fan further includes a second cylinder fixed to the second main surface of the vane at a position outward from the third blade on the second main surface in the radial direction.

* * * * *